United States Patent
Barkoutsos et al.

(10) Patent No.: US 11,966,813 B2
(45) Date of Patent: Apr. 23, 2024

(54) MITIGATION OF READOUT ERROR IN A QUANTUM COMPUTATION

(71) Applicant: International Business Machines Corporation, Armonk, NY (US)

(72) Inventors: Panagiotis Barkoutsos, Zurich (CH); Jakob Max Guenther, Zurich (CH); Francesco Tacchino, Zurich (CH); James Robin Wootton, Basel (CH); Ivano Tavernelli, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 572 days.

(21) Appl. No.: 17/206,996

(22) Filed: Mar. 19, 2021

(65) Prior Publication Data
US 2022/0300845 A1 Sep. 22, 2022

(51) Int. Cl.
*G06N 10/00* (2022.01)
*G06F 9/30* (2018.01)
*G06F 9/38* (2018.01)
*G06N 10/40* (2022.01)
*G06N 10/70* (2022.01)

(52) U.S. Cl.
CPC ......... *G06N 10/00* (2019.01); *G06F 9/30156* (2013.01); *G06F 9/3877* (2013.01); *G06N 10/40* (2022.01); *G06N 10/70* (2022.01)

(58) Field of Classification Search
CPC ........ G06N 10/00; G06N 10/40; G06N 10/70; G06F 9/30156; G06F 9/3877
USPC ...................................................... 714/752
See application file for complete search history.

(56) References Cited

U.S. PATENT DOCUMENTS

| | | | |
|---|---|---|---|
| 5,768,297 A * | 6/1998 | Shor | G06N 10/00 714/763 |
| 10,878,332 B1 | 12/2020 | Zeng et al. | |
| 10,972,133 B2 * | 4/2021 | Chamberland | G06N 10/00 |
| 11,263,076 B2 * | 3/2022 | Nickerson | G06F 11/10 |
| 11,321,627 B1 * | 5/2022 | Arriola | G06N 10/40 |
| 2017/0346627 A1 * | 11/2017 | Alleaume | H04L 9/0858 |
| 2017/0364362 A1 * | 12/2017 | Lidar | G06F 9/3861 |
| 2019/0042392 A1 | 2/2019 | Matsuura et al. | |
| 2019/0044543 A1 * | 2/2019 | Chamberland | G06N 10/00 |

(Continued)

FOREIGN PATENT DOCUMENTS

| CN | 111510158 A | 8/2020 |
|---|---|---|
| CN | 111953356 A | 11/2020 |

OTHER PUBLICATIONS

Paler, Circular CNOT Circuits: Definition, Analysis and Application to Fault-Tolerant Quantum, Apr. 11, 2016, IEEE, pp. 1-14. (Year: 2016).*

(Continued)

*Primary Examiner* — John J Tabone, Jr.
(74) *Attorney, Agent, or Firm* — Amin, Turocy & Watson, LLP

(57) ABSTRACT

Embodiments are provided for error mitigation in quantum programs. In some embodiments, a system can include a processor that executes computer-executable components stored in memory. The computer-executable components include a compilation component that causes encoding of one or more qubits according to a circular repetition code at a time after operations on the one or more qubits and before readout.

20 Claims, 18 Drawing Sheets

(56) References Cited

U.S. PATENT DOCUMENTS

| | | | |
|---|---|---|---|
| 2020/0341837 A1* | 10/2020 | Cross | G06N 10/00 |
| 2020/0364598 A1 | 11/2020 | Ashikhmin | |
| 2021/0019223 A1* | 1/2021 | Chamberland | G06F 11/1048 |
| 2021/0124640 A1* | 4/2021 | Nickerson | G06N 10/00 |
| 2021/0125094 A1* | 4/2021 | Chamberland | G06F 17/16 |
| 2021/0125096 A1* | 4/2021 | Puri | H04L 1/04 |
| 2021/0194507 A1* | 6/2021 | Delfosse | G06N 10/00 |
| 2021/0399743 A1 | 12/2021 | Zheng et al. | |
| 2022/0300845 A1* | 9/2022 | Barkoutsos | G06F 9/3877 |
| 2022/0374760 A1* | 11/2022 | Chiani | H03M 13/159 |

OTHER PUBLICATIONS

Ottaviani et al., Implementation of a three-qubit quantum error correction code in a cavity-QED setup, Jul. 5, 2010, IEEE, pp. 1-9. (Year: 2010).*

Chao et al., "Quantum Error Correction with Only Two Extra Qubits," Physical Review Letters 121, 050502 (2018), 5 pages.

Dumitrescu et al., "Cloud Quantum Computing of an Atomic Nucleus," Physical Review Letters 120, 210501 (2018), 6 pages.

Li et al., "Efficient Variational Quantum Simulator Incorporating Active Error Minimization," Physical Review X 7, 021050 (2017), 14 pages.

Temme et al., "Error Mitigation for Short-Depth Quantum Circuits," PRL 119, 180509 (2017), 5 pages.

Kandala et al., "Error mitigation extends the computational reach of a noisy quantum processor," Nature 567, Mar. 28, 2019, 11 pages.

Endo et al., "Practical Quantum Error Mitigation for Near-Future Applications," arXiv:1712.09271v2 [quant-ph] May 27, 2018, 20 pages.

Barron et al., "Preserving Symmetries for Variational Quantum Eigensolvers in the Presence of Noise," arXiv:2003.00171v1 [quant-ph], Feb. 29, 2020, 13 pages.

McClean et al., "Hybrid Quantum-Classical Hierarchy for Mitigation of Decoherence and Determination of Excited States," Phys. Rev. A 95, 042308—Published Apr. 6, 2017, 10 pages.

McClean et al., "Decoding quantum errors with subspace expansions," Nature Communications vol. 11, Article No. 636 (2020), 9 pages.

McClean et al., "The theory of variational hybrid quantum-classical algorithms," New J. Phys. 18 023023, 2016, 23 pages.

Sagastizabal et al., "Experimental error mitigation via symmetry verification in a variational quantum eigensolver," Physical Review A 100, 010302(R) (2019), 6 pages.

McArdle et al., "Error-mitigated digital quantum simulation," Phys. Rev. Lett. 122, 180501 (2019), 17 pages.

Mell et al., "The NIST Definition of Cloud Computing," Recommendations of the National Institute of Standards and Technology, NIST Special Publication 800-145, Sep. 2011, 7 pages.

International Search Report and Written Opinion received for PCT Application Serial No. PCT/CN2022/081719 dated Jun. 20, 2022, 8 pages.

Ottaviani et al., "Implementation of a three-qubit quantum error correction code in a cavity-QED setup," arXiv:1005.3072v2 [quant-ph] Jul. 5, 2010, 9 pages.

* cited by examiner

MITIGATION OF READOUT ERROR IN A QUANTUM COMPUTATION

BACKGROUND

One or more embodiments of the invention relate to mitigation of readout error in a quantum computation.

Quantum computers are constructed from quantum devices coupled to an environment that may decohere and relax quantum information contained in the quantum device. Thus, such devices may be subject to external noise. As a result, a quantum processor formed by quantum devices may be noisy and errors may be present in quantum computations using the quantum processor. Such noise and errors may be present irrespective of the architecture of the quantum devices.

Readout error may arise from a quantum measurement of the quantum devices utilized in a quantum computation, after the quantum devices have been manipulated according to the operations defining the quantum computation. Accordingly, improved technologies for mitigation of readout error may be desired.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later.

According to an embodiment, a system is provided. The system includes a processor that executes computer-executable components stored in memory. The computer-executable components include a compilation component that cause encoding of one or more qubits according to a circular repetition code at a time after operations on the one or more qubits and before readout. Thus, measurements defining the readout are the only operations acting on encoded qubit state(s), whereas all other operations describing the preparation of the joint state of the one or more qubits can be implemented without encoding. Therefore, by encoding the one or more qubits using a circular repetition code, readout errors can be reduced in a quantum computation involving the encoded qubit(s).

In addition, or in other embodiments, the computer-executable components also include a branch identification component that identifies a first chain of ancilla qubits coupled to a particular qubit of the one or more qubits, a second chain of ancilla qubits coupled to the particular qubit, and a flag qubit joining the first chain of ancilla qubits and the second chain of ancilla qubits. The encoding of the one or more qubits includes encoding the particular qubit by encoding the first chain of ancilla qubits using repetition coding, and encoding the second chain of ancilla qubits using the repetition encoding.

According to another embodiment, a computer-implemented method is provided. The computer-implemented method includes causing, by a processor, encoding of one or more qubits according to a circular repetition code at a time after operations on the one or more qubits and before readout.

According to a further embodiment, a computer program product for mitigation of readout errors in a quantum computation. The computer program product includes a computer-readable storage medium having program instructions embodied therewith. The program instructions are executable by a processor to cause the processor to cause encoding of one or more qubits using a circular repetition code at a time after operations on the multiple qubits and before readout.

DETAILED DESCRIPTION

Figure 1:
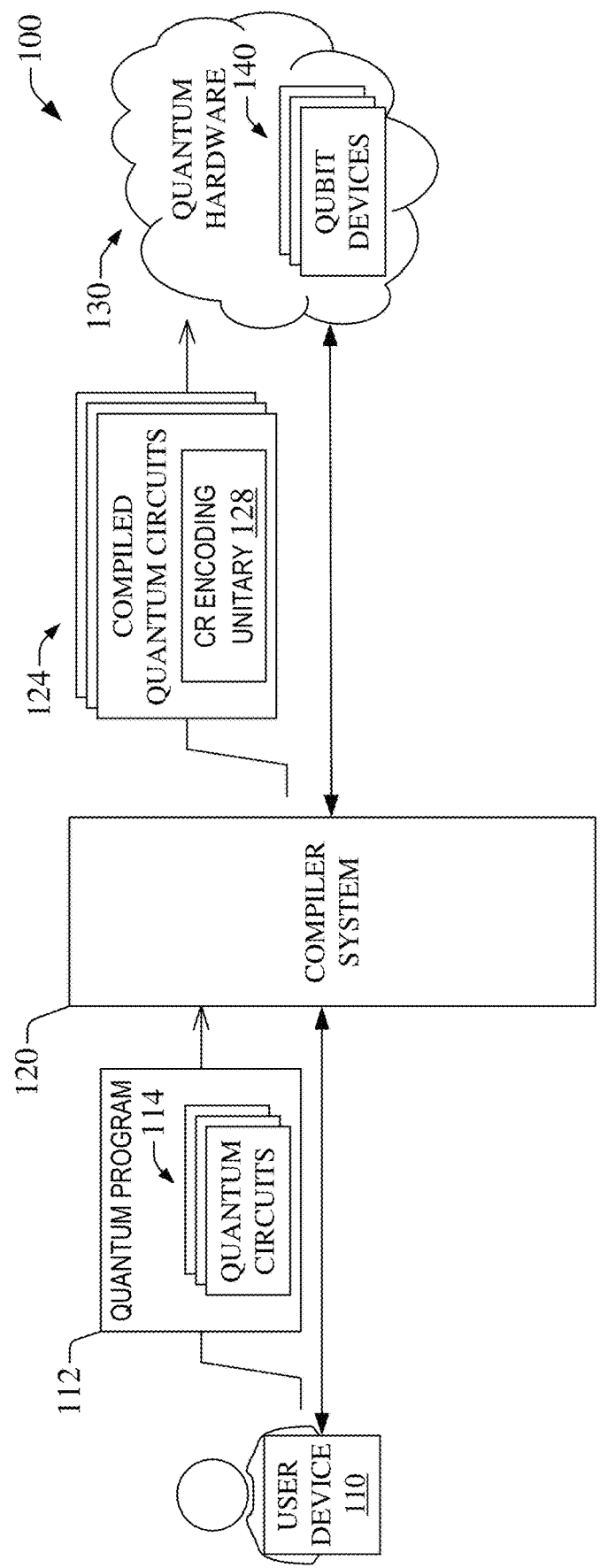
FIG. 1 illustrates a non-limiting example of an operational environment for readout error mitigation in a quantum computation, in accordance with one or more embodiments described herein.

Embodiments of this disclosure address the issue of readout error mitigation in a quantum computation. To that end, embodiments of this disclosure utilize an exemplary form of a quantum repetition code that leverage redundancy to protect quantum information from the effects of noise. Specifically, embodiments of this disclosure cause the encoding of the respective states of one or several qubit devices according to a circular repetition encoding. Those encoded state(s) are encoded at a time after operations on the one or more qubit devices are performed and before readout. Accordingly, measurements defining the readout are the only operations acting on the encoded qubit state(s), whereas all other operations defining the quantum computation can be implemented without encoding. The circular repetition encoding leverages closed-loop chains of qubit devices. A qubit device in such a chain is identified for encoding. That qubit device is referred to as a root qubit. First and second chains of ancilla qubit devices are identified in the close-loop chain. Each of those chains of ancilla qubit devices are coupled to the root qubit. Another qubit device, referred to as a flag qubit, also is identified. The flag qubit joins the first and second chain of ancilla qubits.

A sequence of controlled NOT (CNOT) gates define a repetition encoding in each one of the first and second chain of ancilla qubits. A CNOT gate also couples a qubit device at an end of the first chain of ancilla qubits. Another CNOT gate further couples the flag qubit to a qubit device at the end of the second chain of ancilla qubits. In both cases, the flag qubit is the target of such CNOT gates. Accordingly, the repetition encoding of both chains of ancilla qubits in conjunction with the respective coupling of those chains to the flag qubit constitute the circular repetition encoding. By measuring the single-qubit state of the flag qubit the quality of the encoding can be detected. A non-faulty encoding can result in a majority-vote evaluation that provide an error-mitigated outcome for the single-qubit state of the root qubit.

The exemplary circular repetition encoding described herein can be applied in various types of quantum computations. Results of quantum computation of electronic structure and time propagation of model Hamiltonians reveal that the circular repetition encoding yields greater accuracy relative to commonplace techniques for readout error mitigation.

Exemplary embodiments of the disclosure may provide several advantages relative to commonplace approaches to mitigation of readout errors, such as readout calibration matrices, non-circular repetition codes, and small stabilizer codes. As an example, embodiments of this disclosure avoid imposing constraints on the quantum circuit to be encoded and can be utilized to encode the single-qubit state of any number of qubit devices. In sharp contrast, commonplace stabilizer codes can only encode the single-qubit states of two qubit devices, and can be applied to a limited set of logical gates. As another example, by reducing readout errors, embodiments of this disclosure can yield more accurate estimates from a quantum computation. As a result, embodiments described herein can be used to approach to chemical accuracy and better estimation of expectation values and dynamics of physical observables. To that point, not only can the embodiments of this disclosure be applied to variational algorithms, but the embodiments also can be applied in simulations that involve measurement of observables in a certain wavefunction generated by a quantum circuit. As yet another example, embodiments of this disclosure do not scale exponentially, in sharp contrast to classical post-measurement readout error mitigation. Accordingly, circular repetition encoding of many qubits can be implemented, with ensuing reduction of readout error and associated improved accuracy of quantum computations that utilize the encoded qubits.

Some exemplary embodiments of this disclosure are described with reference to qubit devices and quantum circuits simply for the sake of illustration. The disclosure, however, is not limited in that respect. Indeed, the principles of this disclosure can be applied to any representation of quantum operations and any type of quantum devices (such as qudit devices) utilized in a physical implementation of a quantum computer. Further, simply as an illustration, the improvements afforded by the circular repetition strength of this disclosure are shown for quantum computations of electronic structure calculations and time propagation of model Hamiltonians. Again, the principles of this disclosure are not limited to those types of quantum computations. Indeed, the circular repetition encoding of this disclosure can be broadly applied in quantum computations in a wide variety of disciplines, such as physics, chemistry, materials science, cybersecurity, bioinformatics, and the like.

With reference to the drawings, FIG. 1 illustrates a non-limiting example of an operational environment 100 for readout error mitigation in a quantum computation, in accordance with one or more embodiments described herein. The operational environment 100 includes a user device 110 (e.g., a classical computer) operatively coupled to a compiler system 120. The user device 110 can send data defining a quantum program 112 to a compiler system 120 for compilation. The quantum program 112 can define one or several quantum algorithms. Thus, the quantum program 112 can include a group of quantum circuits 114 that represents at least a portion of the quantum program 112. The group of quantum circuits 114 includes one or multiple quantum circuits. In some cases, the group of quantum circuits 114 includes particular quantum circuits representing a quantum algorithm (such as a variational quantum algorithm) included in the quantum program 112.

Each quantum circuit in the group of quantum circuits 114 can include one or several of various quantum gates. Those quantum gates can include, for example, a Pauli gate (X gate or Y gate, for example) representing a Pauli operator; a Hadamard gate; a rotation gate ($R_z$ gate and phase shift gate, for example); a controlled-phase shift gate; a CNOT gate; a Toffoli (or controlled-controlled-NOT) gate; a swap gate; a Fredkin gate; among many other gates. The data defining the quantum program 112 can include, in some embodiments, first data defining one or several first quantum gates that constitute a first quantum circuit of the group of quantum circuits 114. The data defining the quantum program 112 also can include second data defining one or several second quantum gates that constitute a second quantum circuit of the group of quantum circuits 114. In addition, or in some embodiments, rather than defining particular quantum gates, the data defining the quantum program 112 can include first data defining one or several general unitary matrices U constituting at least one of the group of quantum circuits 114.

Figure 2:
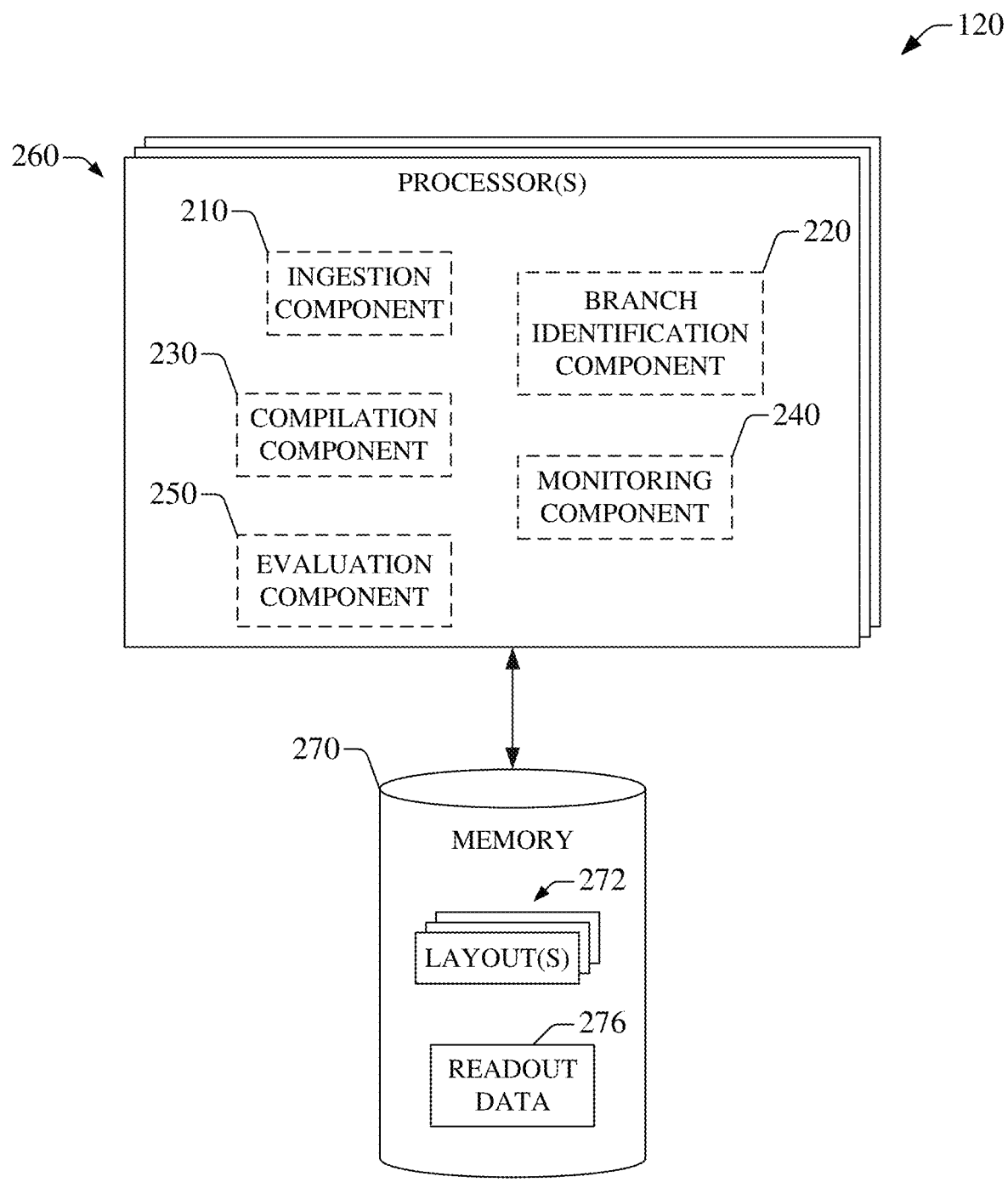
FIG. 2 illustrates a non-limiting example of a computing system for readout error mitigation in a quantum computation, in accordance with one or more embodiments described herein.

The compiler system 120 can receive the data defining the quantum program 112. In some embodiments, as is illustrated in FIG. 2, the compiler system 120 can include an ingestion component 210 that can receive the data defining the quantum program 112. As is also illustrated in FIG. 2, the compiler system 120 also can include other components, one or several processors 260, and one or several memory devices 270 (referred to as memory 270). The processor(s) 260 and the memory 270 can be electrically, optically, and/or communicatively coupled to one another.

Back to referring to FIG. 1, the compiler system 120 can then compile the quantum program 112 for execution on quantum hardware 130. In some embodiments, the quantum hardware 130 embodies, or includes, a cloud-based quantum computer. In other embodiments, the quantum hardware 130 embodies, or includes, a local quantum computer. Regardless of its spatial footprint, the quantum hardware 130 can include multiple qubit devices 140 arranged in a particular layout. Qubit devices can be solid-state devices of one of several types. Each qubit device of the qubit devices 140 is coupled to an environment that decoheres and relaxes quantum information contained in the qubit device. Thus, the quantum hardware 130 can be noisy. Simply as an illustration, qubit devices can be Josephson junction devices, semiconductor quantum-dots, or defects in a semiconductor material (such as vacancies in Si and Ge). In other embodiments, the qubit devices can include atomic qubits assembled in an ion-trap. For instance, the atomic qubits can be embodied in a calcium ion, an ytterbium ion, or similar ions. In one embodiment, the quantum hardware 130 includes multiple qubit devices 124, each embodied in a transmon.

Figure 3:
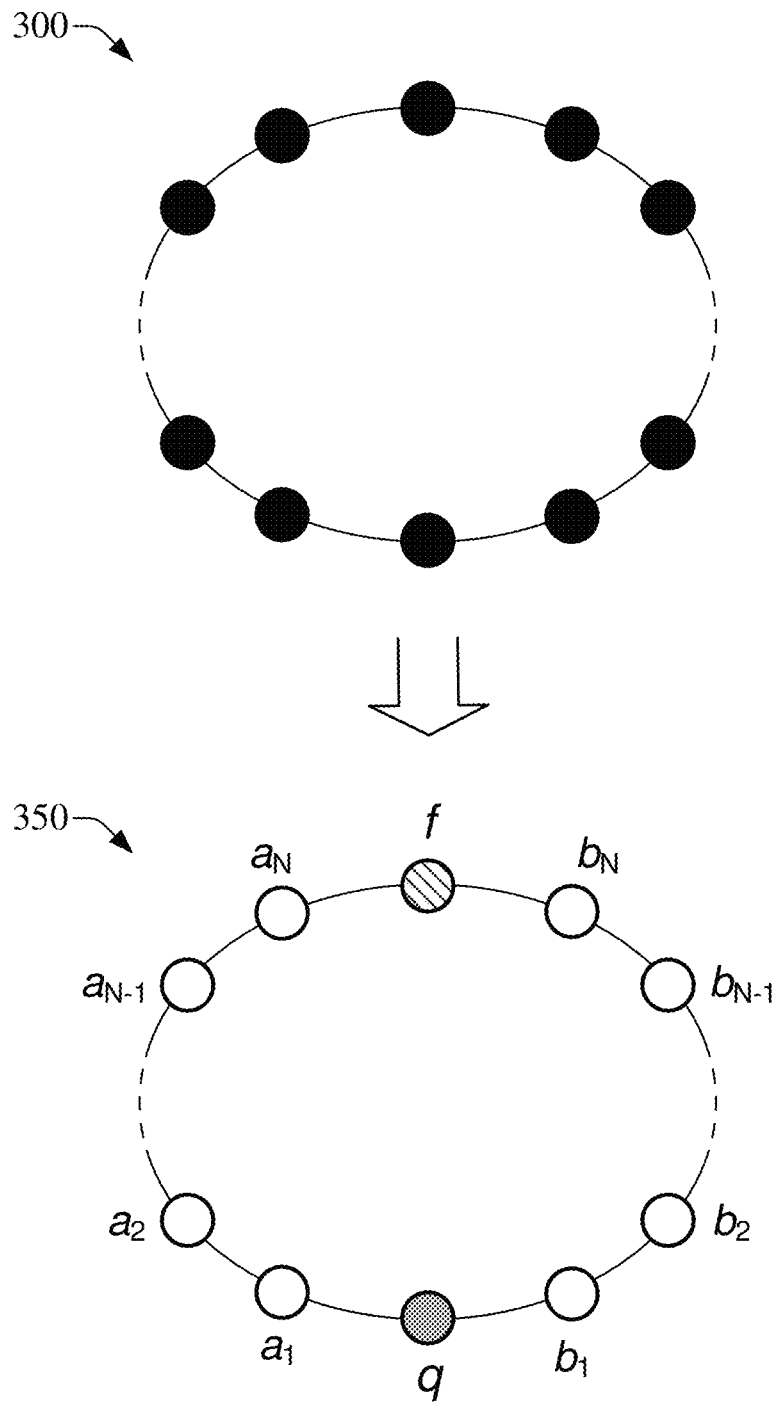
FIG. 3 illustrates a schematic non-limiting example of a closed-loop chain of qubit devices for circular repetition encoding of a particular qubit device within the chain, in accordance with one or more embodiments described herein.

In some cases, the particular layout of the multiple qubit devices 140 can exhibit heavy hexagonal connectivity. Such a layout includes one or several chains of qubits devices forming a closed-loop chain. Accordingly, the qubit devices in such a chain are said to have circular connectivity. Diagram 300 in FIG. 3 schematically depicts a closed-loop chain of qubit devices. In some cases, the particular layout of the multiple qubit devices 140 can exhibit connectivity that supports several closed-loop chains of qubits. Each one of those several closed-loop chains of qubits can permit encoding a qubit according to the circular repetition encoding described herein.

With further reference to FIG. 1, the compiler system 120 can leverage the circular connectivity of qubit devices included in the qubit devices 140 during compilation of the quantum program 112. Specifically, the compiler system 120 can cause the encoding of one or more qubits within a closed-loop chain according to a circular repetition (CR) encoding.

Because the dominant source of inaccuracies affecting readout operations in the quantum hardware 130 can be represented by bit flips in the computational basis, the compiler system 120 can implement repetition encoding schemes specifically designed to detect and correct that form of readout errors. Specifically, consider a particular qubit device in a closed-loop chain of qubit devices that is given in a generic state $a|0\rangle + b|1\rangle$. That particular qubit device is herein referred to as a root qubit. By using $n_{rep}$ additional qubit devices initially prepared in state $|0\rangle$, the following mapping can be represented as:

$$(a|0\rangle + b|1\rangle)|0\ldots 0\rangle \longmapsto a|0\ldots 0\rangle + b|1\ldots 1\rangle. \quad (1)$$

The $n_{rep}$ additional qubit devices are herein referred to as ancilla qubits. In the example shown in diagram 350 in FIG. 3, the root qubit is denoted by q and the ancilla qubits are shown as white circles. A first subset of the ancilla qubits forms a first repetition branch. Qubit devices in the first repetition branch are denoted by $a_1, a_2, \ldots, a_{N-1}$, and $a_N$, with $N = n_{rep}/2$. A second subset of the ancilla qubits forms a second repetition branch. Qubit devices in the second repetition branch are denoted by $b_1, b_2, \ldots, b_{N-1}$, and $b_N$. For simplicity of explanation, embodiments of this disclosure are described with respect to repetition codes for which $n_{rep} + 1$ is odd.

The foregoing mapping represents a repetition encoding and can be formally generated by $n_{rep}$ stabilizers $\{Z_0Z_1; Z_1Z_2, \ldots, Zn_{rep-1}Z_{nref}\}$, where $Z_i$ is a Pauli $\sigma_z$ quantum gate applied to qubit device i. The root qubit is associated with index i=0. It is noted that the state $a|0\ldots 0\rangle + b|1\ldots\rangle$ is not equivalent to $n_{rep}+1$ copies of the state $a|0\rangle + b|1\rangle$, as this would in general violate the no-cloning theorem, and only the eigenvalues associated with the Z operator of the original single-qubit state are stored redundantly. As a result, errors caused by the bit flip channel, which are associated with the Pauli X operator, can be detected and mitigated with such a repetition encoding.

The compiler system 120 can implement the circular repetition encoding at a time after operations on one or more qubits and before quantum measurements (referred to as readout). That is, those measurements are the only operations acting on encoded states. All other operations describing the preparation of the joint state of one or more root qubits can be implemented without encoding. Such other operations represent at least a portion of a particular quantum computation and can be generically represented by a unitary U acting on one or more root qubits being encoded. Therefore, that unitary can be followed by one or more second unitaries, each representing the operations pertaining to circular repetition encoding of a respective one of the root qubit(s) being encoded. In addition, in some embodiments, each of the one or more second unitaries has the same structure of encoding operations. Accordingly, a same encoding unitary can be utilized to encode each qubit in a set of multiple qubits being encoded. Accordingly, each one of multiple root qubits can be encoded individually, resulting in the circular repetition encoding of the multiple root qubits.

Figure 4A:
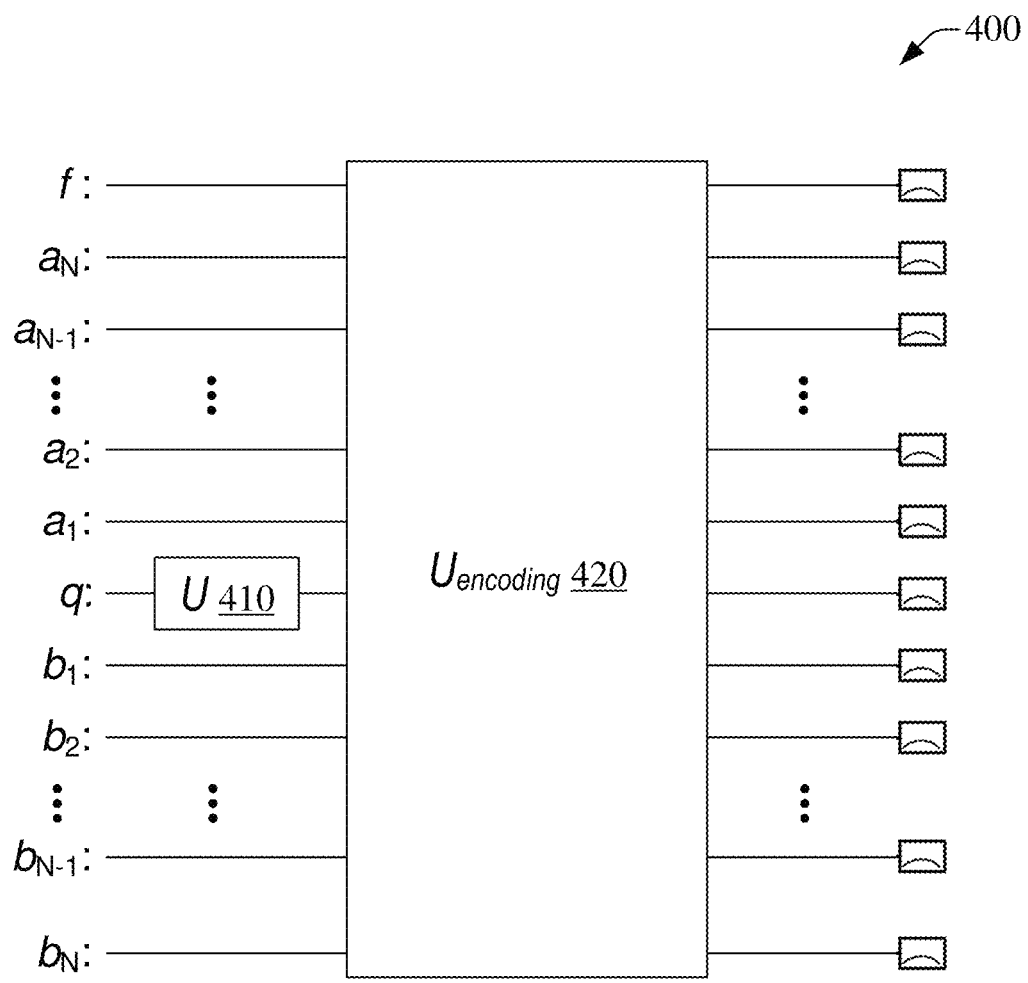
FIG. 4A schematically illustrates a temporal relationship between unitary (U) representing operations on a single qubit and another unitary ($U_{encoding}$) representing a circular repetition encoding of the single qubit, in accordance with one or more embodiments described herein.

As an illustration, FIG. 4A presents a schematic quantum circuit 400 depicting the temporal relationship between a unitary 410, denoted by U, representing a one-qubit computation and a second unitary 420, denoted by $U_{encoding}$, representing the operations pertaining to the circular repetition encoding of a root qubit q. Measurements are schematically depicted as dial icons on the right-hand side in FIG. 4A.

Figure 4B:
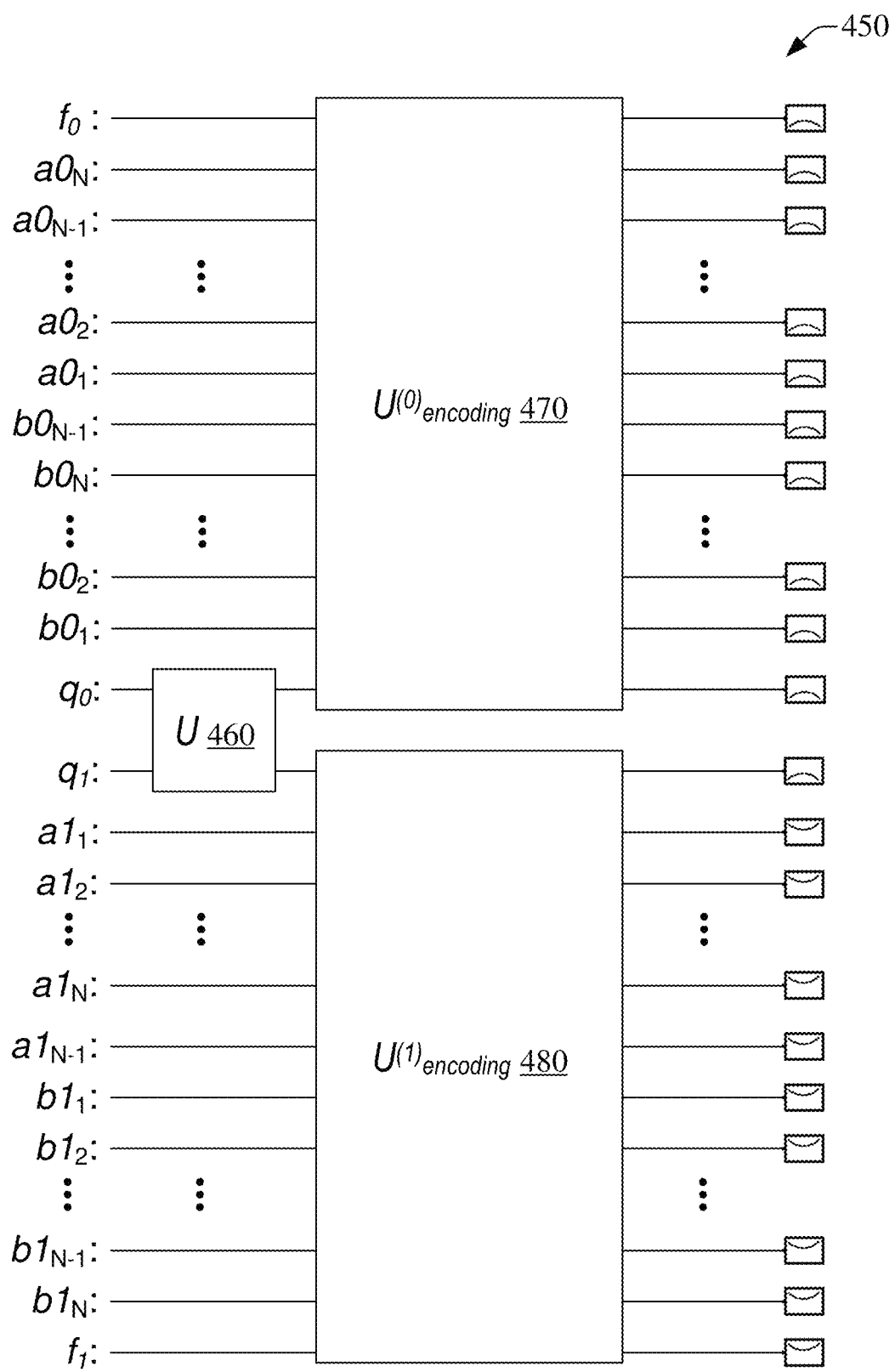
FIG. 4B schematically illustrates a temporal relationship between unitary (U) representing operations on two qubits and two unitaries ($U^{(0)}_{encoding}$ and $U^{(1)}_{encoding}$) representing a circular repetition encoding of the two qubits, in accordance with one or more embodiments described herein.

As another illustration, FIG. 4B presents a schematic quantum circuit 450 depicting the temporal relationship between a unitary 460, denoted by U, representing a two-qubit computation and two unitaries each representing the operations pertaining to the circular repetition encoding of a respective root qubits. A first unitary 470, denoted by $U^{(0)}_{encoding}$, encodes a first root qubit $q_0$ by operating of two first repetition branches A0 and B0 and a flag qubit $f_0$. Repetition branch A0 includes ancilla qubits denoted by $a0_1$, $a0_2, \ldots, a0_{N-1}$, and $a0_N$, and repetition branch B0 includes ancilla qubits denoted by $b0_1, b0_2, b0_{N-1}$, and $b0_N$. A second unitary 470, denoted by $U^{(1)}_{encoding}$, encodes a second root qubit $q_1$ by operating of two repetition branches A1 and B1 and a flag qubit $f_1$. Repetition branch A1 includes ancilla qubits denoted by $a1_1, a1_2, \ldots, a1_{N-1}$, and $a1_N$, and repetition branch B1 includes ancilla qubits denoted by $b1_1$, $b1_2, \ldots, b1_{N-1}$, and $b1_N$. Thus, root qubits $q_0$ and $q_1$ are encoded individually (e.g., independently from one another) and in parallel. Further, $U^{(0)}_{encoding}$ and $U^{(1)}_{encoding}$ have the same structure of encoding operations. After $q_0$ and $q_1$ are encoded individually, each of those encoded qubits can be placed in a network of encoded qubits provided that circular connectivity is present in a layout of qubits including $q_0$ and $q_1$. Measurements are again schematically depicted as dial icons on the right-hand side in FIG. 4B.

A circular repetition encoding can be performed by applying, for example, $n_{rep}$ CNOT gates targeting $n_{rep}$ ancilla qubits. To the end, in some embodiments, the compiler system 120 can include a branch identification component 220 (FIG. 2) that can identify two sets of ancilla qubits, each set having $n_{rep}$ qubit devices. Each one of those sets constitutes a repetition branch. The branch identification component 220 also can identify a root qubit (e.g., q in FIG. 3) and another qubit device that is connected to both set of ancilla qubit devices. That other qubit device serves as a flag qubit (denoted by f in diagram 350 in FIG. 3).

As mentioned, a unitary $U_{encoding}$ represents the circular repetition encoding. The unitary $U_{encoding}$ maps each root qubit to its encoded version by operating on an ancillary register corresponding to first and second repetition branches respectively defined by the first and second sets of ancilla qubits. That unitary $U_{encoding}$ can be applied to encode each qubit in a set of multiple qubits being encoded. As described above, for two qubits, $U^{(0)}_{encoding}$ (FIG. 4B) is the same as $U_{encoding}$ and $U^{(1)}_{encoding}$ (FIG. 4B) also is the same as $U_{encoding}$.

In some cases, $U_{encoding}$ includes an arrangement of CNOT) operations that define the encoding. Such an arrangement can correspond to a sequence of CNOT operations that sequentially target ancilla qubits (see FIG. 2 for an example). The compiler system 120 can configure $U_{encoding}$. To that end, in some embodiments, the compiler system 120 can include a compilation component 230 that can receive data defining a first repetition branch, a second repetition branch, a flag qubit, and a root qubit. In some cases, such data can be received from the branch identification component 220. In other cases, the compilation component 220 can load such data from layout(s) 272. The compilation component 230 can then configure $U_{encoding}$ using the received data.

The circular repetition encoding utilizes a split-repetition layout in which the first repetition branch and the second repetition branch are connected by the flag qubit that is initialized in state $|0\rangle$. Each one of the first repetition branch and the second repetition branch has a same number of qubit devices ($n_{rep}$, as is described above) and connects to the flag qubit by a CNOT gate, where the flag qubit is the target in both cases. The flag qubit is denoted by f in diagram 350 in FIG. 3. Because circular repetition encoding relies on repetition branches of auxiliary/ancillary/ancilla qubits, sensitivity to error-propagation can be reduced relative to repetition encoding using a single chain of 2N ancilla qubits. Further, many of the CNOT gates in $U_{encoding}$ can be executed in parallel, thus reducing the effective encoding circuit depth.

Figure 5A:
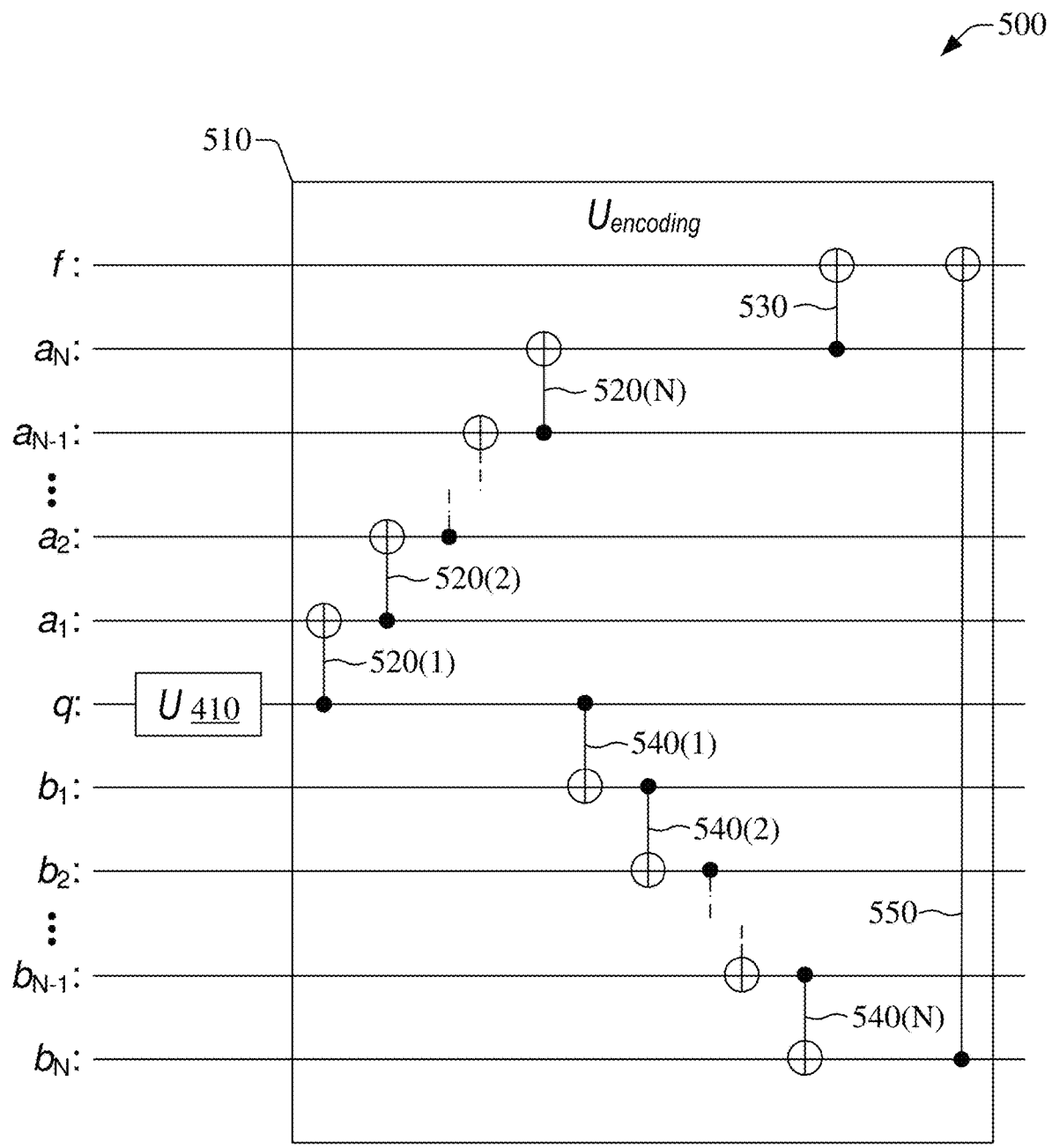
FIG. 5A illustrates a non-limiting example of a unitary representing a circular repetition encoding, in accordance with aspects described herein.

FIG. 5A illustrates a non-limiting example of $U_{encoding}$, in accordance with aspects described herein. A unitary 510 embodies $U_{encoding}$. The unitary 510 includes a first sequence of CNOT gates that operate on respective ancilla qubits of the first repetition branch. The unitary 510 also includes a second sequence of CNOT gates that operate on respective ancilla qubits of the second repetition branch. As is illustrated in FIG. 5A, the first sequence of CNOT gates includes a first CNOT gate 520(1) coupling the root qubit and $a_1$, with the root qubit being the control and $a_1$ being the target; a second CNOT gate 520(2) coupling $a_1$ and $a_2$, with $a_1$ being the control and $a_2$ being the target; continuing in similar succession (depicted by a broken CNOT gate) up to a CNOT gate 520(N) coupling $a_{N-1}$ and $a_N$, with $a_{N-1}$ being the control and $a_N$ being the target. Further, the second sequence of CNOT gates includes a first CNOT gate 540(1) coupling the root qubit and $b_1$, with the root qubit being the control and $b_1$ being the target; a second CNOT gate 540(2) coupling $b_1$ and $b_2$, with $b_1$ being the control and $b_2$ being the target; continuing in similar succession (depicted by a broken CNOT gate) up to a CNOT gate 540(N) coupling $b_{n-1}$ and $b_N$, with $b_{N-1}$ being the control and $b_N$ being the target. Because the repetition encoding is a circular repetition encoding, a CNOT gate 530 couples the flag qubit to ancilla qubits $a_N$, with $a_N$ being the control and the flag qubit being the target. In addition, a CNOT gate 550 also couples the flag qubit to ancilla qubits $b_N$, with $b_N$ being the control and the flag qubit being the target.

Although in FIG. 5A the second repetition branch is used after the first repetition branch in the circular repetition encoding, the disclosure is not limited in that respect. Indeed, one of the strengths of circular repetition encoding is the parallel execution of CNOT gates in the first repetition branch and CNOT gates in the second repetition branch. In such a scenario, for example, the CNOT gate 520(2) and the CNOT gate 540(2) would be aligned in FIG. 5A.

Figure 5B:
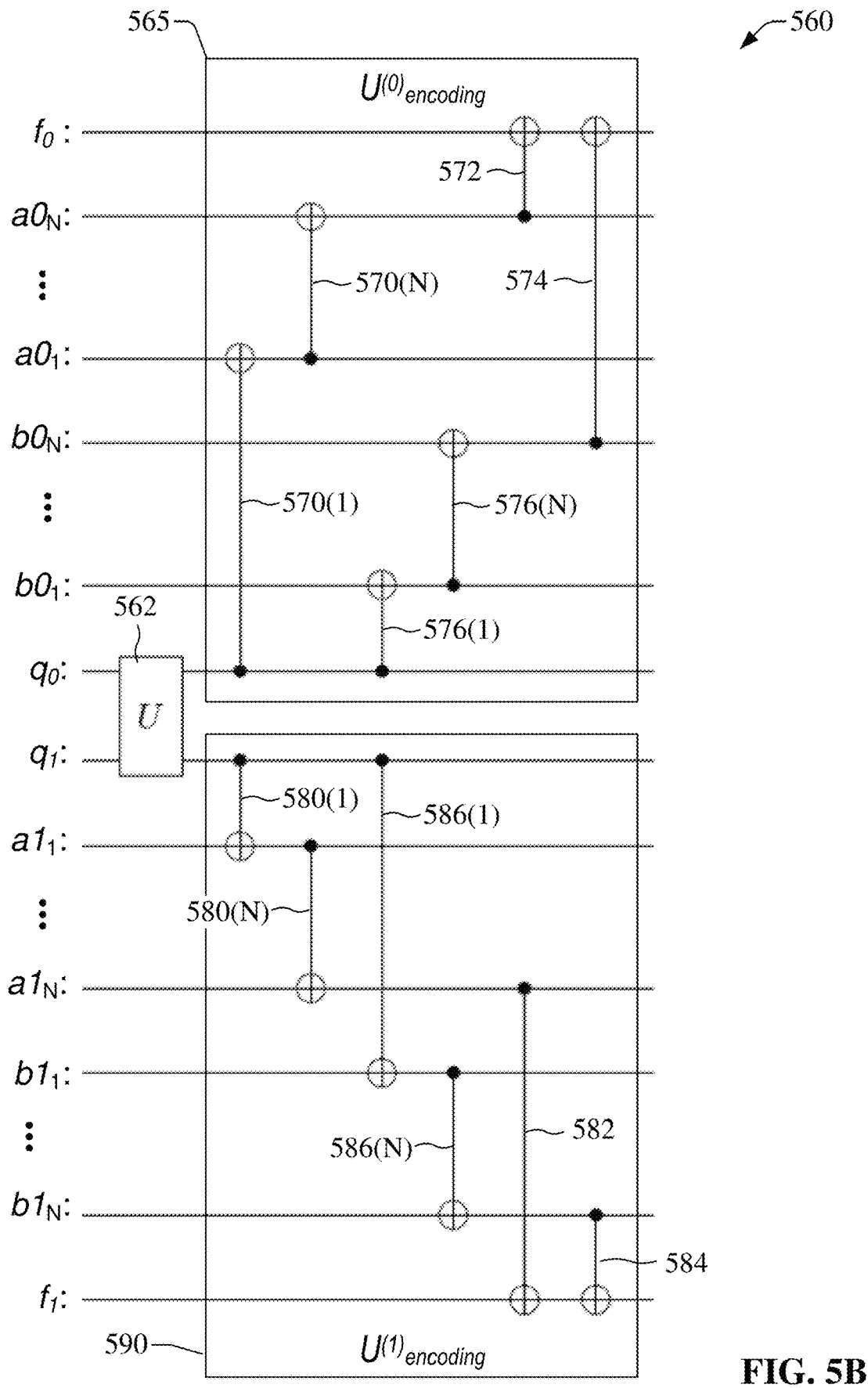
FIG. 5B illustrates non-limiting examples of unitaries representing circular repetition encoding of respective qubits, in accordance with aspects described herein.

FIG. 5B presents a schematic quantum circuit 560 depicting the temporal relationship between a unitary 562, denoted by U, representing a two-qubit computation and two unitaries each representing the operations pertaining to the circular repetition encoding of respective root qubits $q_0$ and $q_1$. The two unitaries include $U^{(0)}_{encoding}$ and $U^{(1)}_{encoding}$ for encoding of two qubits, in accordance with aspects described herein. A unitary 565 embodies $U^{(0)}_{encoding}$. The unitary 565 includes a first sequence of CNOT gates that operate on respective ancilla qubits of the first repetition branch A0. The unitary 565 also includes a second sequence of CNOT gates that operate on respective ancilla qubits of the second repetition branch B0. As mentioned, each of those branches are coupled to root qubit $q_0$. As is illustrated in FIG. 5B, the first sequence of CNOT gates includes a first CNOT gate 570(1) coupling the root qubit $q_0$ and $a0_1$, with the root qubit being the control and $a0_1$ being the target; continuing in succession up to a CNOT gate 570(N) coupling $a0_{N-1}$ and $a0_N$, with $a0_{N-1}$ being the control and $a0_N$ being the target. Further, the second sequence of CNOT gates includes a first CNOT gate 576(1) coupling the root qubit $q_0$ and $b0_1$, with the root qubit being the control and $b0_1$ being the target; continuing in succession up to a CNOT gate 576(N) coupling $b0_{n-1}$ and $b0_N$, with $b0_{N-1}$ being the control and $b0_N$ being the target. Because the repetition encoding is a circular repetition encoding, a CNOT gate 572 couples the flag qubit $f_0$ to ancilla qubits $a0_N$, with $a0_N$ being the control and the flag qubit $f_0$ being the target. In addition, a CNOT gate 574 also couples the flag qubit $f_0$ to ancilla qubits $b0_N$, with $b0_N$ being the control and the flag qubit being the target.

A unitary 590 embodies $U^{(1)}_{encoding}$. The structure of operations in the unitary 590 is the same as in the unitary 565. Specifically, the unitary 590 includes a first sequence of CNOT gates that operate on respective ancilla qubits of the first repetition branch A1. The unitary 590 also includes a second sequence of CNOT gates that operate on respective ancilla qubits of the second repetition branch B1. As mentioned, each of those branches are coupled to root qubit $q_1$. As is illustrated in FIG. 5B, the first sequence of CNOT gates includes a first CNOT gate 580(1) coupling the root qubit $q_1$ and $a1_1$, with the root qubit being the control and $a1_1$ being the target; continuing in succession up to a CNOT gate 580(N) coupling $a1_{N-1}$ and $a1_N$, with $a1_{N-1}$ being the control and $a1_N$ being the target. Further, the second sequence of CNOT gates includes a first CNOT gate 586(1) coupling the root qubit $q_1$ and $b1_1$, with the root qubit being the control and $b0_1$ being the target; continuing in succession up to a CNOT gate 586(N) coupling $b1_{n-1}$ and $b1_N$, with $b1_{N-1}$ being the control and $b1_N$ being the target. Because the repetition encoding is a circular repetition encoding, a CNOT gate 582 couples the flag qubit $f_1$ to ancilla qubits $a1_N$, with $a1_N$ being the control and the flag qubit $f_1$ being the target. In addition, a CNOT gate 574 also couples the flag qubit $f_1$ to ancilla qubits $b1_N$, with $b1_N$ being the control and the flag qubit being the target.

As mentioned, $U^{(0)}_{encoding}$ and $U^{(1)}_{encoding}$ have the same structure of encoding operations. As such, the unitary 590 and the unitary 565 have the same structure of encoding operations, and, thus, can be referred to as symmetrical relative to one another. Again, although in FIG. 5B the second repetition branches B0 and B1 are used after first repetition branches A0 and A1 in their respective circular repetition encoding, the disclosure is not limited in that respect. As mentioned, one of the strengths of circular repetition encoding is the parallel execution of CNOT gates in a first repetition branch and CNOT gates in a second repetition branch. To that point, the unitary 565 and the unitary 590 can be implemented concurrently, resulting in the circular repetition encoding of the root qubit $q_0$ and the root qubit $q_1$ in parallel and independently from one another.

As in the general case, the initial unencoded state of a root qubit can be expressed as $(a|0\rangle + b|1\rangle)|0\ldots 0\rangle|0\ldots 0\rangle|0\rangle$, where the first qubit device and the last qubit device correspond to the root qubit and flag qubit, respectively, and the two sets of qubits in between constitute the two repetition branches, e.g., $\{a_1, a_2, \ldots, a_{N-1}, a_N\}$ and $\{b_1, b_2, \ldots, b_{N-1}, b_N\}$. See, e.g., FIG. 3.

In the absence of error during the split repetition encoding, the state after Uencoding can be expressed as $(a|0\rangle|0\ldots 0\rangle|0\ldots 0\rangle + b|1\rangle|1\ldots 1\rangle|1\ldots 1\rangle)|0\rangle$. Indeed, the last CNOT gates (e.g., gate 430 and gate 450 in FIG. 5) targeting the flag qubit from each branch leave the flag qubit in $|0\rangle$ because both control qubit devices ($a_N$ and $b_N$) are in the same state. However, if one qubit flips on one of the repetition branches, e.g., the first repetition branch, the state becomes $(a|0\rangle|0\ldots 0\rangle|0\ldots 1\rangle + b|1\rangle|1\ldots 0\rangle|1\ldots 1\rangle)|1\rangle$. Therefore, a state $|1\rangle$ observed of the flag qubit detects an error during the encoding; e.g., detects faulty encoding. In such case, the associated outcome bit string can be discarded. Conversely, the flag qubit being in state $|0\rangle$ represent non-faulty encoding. Results under non-faulty encoding are retained and a majority vote evaluation is performed on the other qubits. In some embodiments, the monitoring component 240 can determine the state of the flag qubit and, in response, can either discard or retain the outcome bit string. The evaluation component 150 can perform a majority-vote evaluation when the outcome bit stream is retained.

For qubit devices 140 arranged in a layout that includes multiple replicas of a closed-loop chain of qubits, or an arrangement that has circular connectivity (see FIG. 3 for an example), multiple root qubits corresponding to respective replicas can be encoded individually (e.g., independently from one another) and in parallel with one another. Because the circular repetition encoding of multiple qubits can be performed for each one of the multiple qubits and in parallel with one another, the circular repetition encoding is scalable. Each of these encoded root qubits and associated closed-loop chain of qubits can be leveraged in a multi-qubit quantum computation using the qubit devices 140.

After one or more instances of $U_{encoding}$ have been configured for respective one or more qubits, the compiler system 120 can generate a compiled version of the quantum program 112. The compiled version includes one or several compiled quantum circuits 124 including a CR repetition unitary 128 (e.g., $U_{encoding}$). The compiler system 120 can cause the execution of a compiled version of the quantum program 112. Causing the execution of the compiled version of the quantum program 112 can include sending the one or more compiled quantum circuits 124 for execution by the quantum hardware 130. Causing the execution of the one or more compiled quantum circuits 124 can include causing execution of operations in a quantum computation defined by the quantum program 112, and also causing encoding of one or more qubits according to a circular repetition code at a time after the execution of the operations, on the one or more qubits, and before readout. Further, causing the execution of the compiled version of the quantum program 112 also includes causing measurement, in the computational basis, of all qubit devices represented in the compiled quantum circuits 124. In other words, part of the execution of the compiled version of the quantum program 112 includes measuring all qubit devices utilized in the quantum computation defined by the quantum program 112 and second qubit devices utilized in the circular repetition encoding. In some embodiments, the compiler system 120 can include a monitoring component 240 (FIG. 2) that causes measurement, in the computational basis, of all such qubit devices.

The compiler system 120 can receive readout data resulting from those measurements and can then implement a majority vote evaluation in order to recover the measurement values for the root qubit(s). More specifically, error-mitigated readout results can be recovered for individual root qubits via the majority vote evaluation as applied in a postprocessing stage on the outcome bit strings. In particular, any bit string $b_0 b_1 \ldots bn_{rep}$ resulting from a quantum measurement in the computational basis is decoded as 0 or 1 depending on which of the two values appears more often in the $n_{rep}+1$ output bits. The decoding is successful when less than $(n_{rep}+1)=2$ bit values were flipped by noise. To that end, the compiler system 120 can receive readout data from root qubit(s), flag qubit(s), and ancilla qubits. The compiler system 120 can then implement the majority vote evaluation using the received readout data. In some embodiments, as is illustrated in FIG. 2, the compiler system 120 can include an evaluation component 250 that can receive the readout data and can retain the readout data in the memory 270. The readout data can be retained in one or several records 276 (referred to as readout data 276). The evaluation component 250 can then perform the majority-vote procedure described above.

Figure 6A:
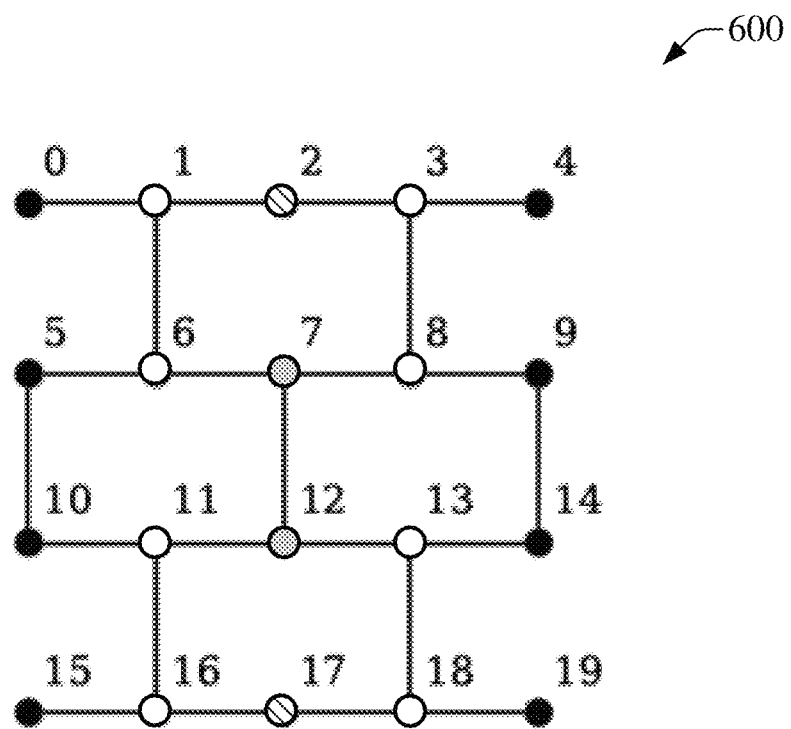
FIG. 6A illustrates a non-limiting example of a layout of qubit devices included in an operational environment for readout error mitigation in a quantum computation, in accordance with one or more embodiments described herein.

There are several layouts of the qubit devices 140 (FIG. 1) that can include a group of multiple qubit devices having circular connectivity. Quantum computations that use such layouts can utilize the circular repetition encoding described herein. Simply for the purpose of illustration, FIG. 6A presents a non-limiting example of a layout 600 of qubit devices 140, in accordance with one or more embodiments described herein. In the layout 600, 20 qubit devices are arranged in a geometry that exhibits many closed-loop chains of qubit devices. Each one of the 20 qubit devices is indexed with a number from 0 to 19. In one example, the 20 qubit devices are embodied in 20 transmon devices.

Figure 6B:
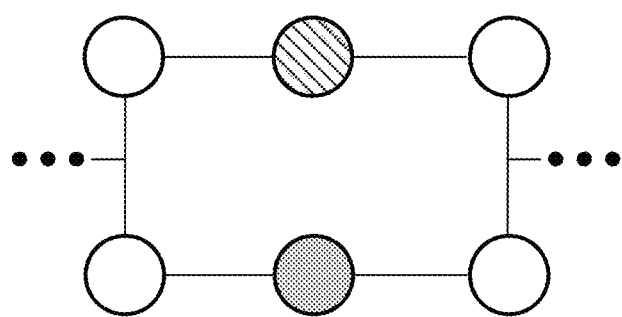
FIG. 6B illustrates a non-limiting example of a closed-loop chain 650 that is present in the layout shown in FIG. 6A.

FIG. 6B illustrates a non-limiting example of a closed-loop chain 650 that is present in the layout 600 shown in FIG. 6A. The closed-loop chain 650 includes four ancilla qubit devices (e.g., ancilla qubits), split into two branches that can be used as repetition branches: A first repetition branch including $a_1$ and $a_2$, and a second repetition branch including $b_1$ and $b_2$. Each one of the branches is coupled at one end with a root qubit and is further coupled with a flag qubit at the other end. A replica of the closed-loop chain 650 also is present in the layout 600 in FIG. 6A. Both closed-loop chains of qubit devices can be utilized in two-qubit quantum computations. One example of the closed-loop chain 650 includes qubit devices 11 and 16 as the first repetition branch; qubit devices 18 and 13 as the second repetition branch; qubit device 17 as the flag qubit; and qubit device 12 as the root qubit. In that case, the replica includes qubit devices 1 and 6 as the first repetition branch; qubit devices 8 and 3 as the second repetition branch; qubit device 2 as the flag qubit; and qubit device 7 as the root qubit. The foregoing numbers denoting qubit devices correspond to respective indices shown in FIG. 6A.

Figure 7A:
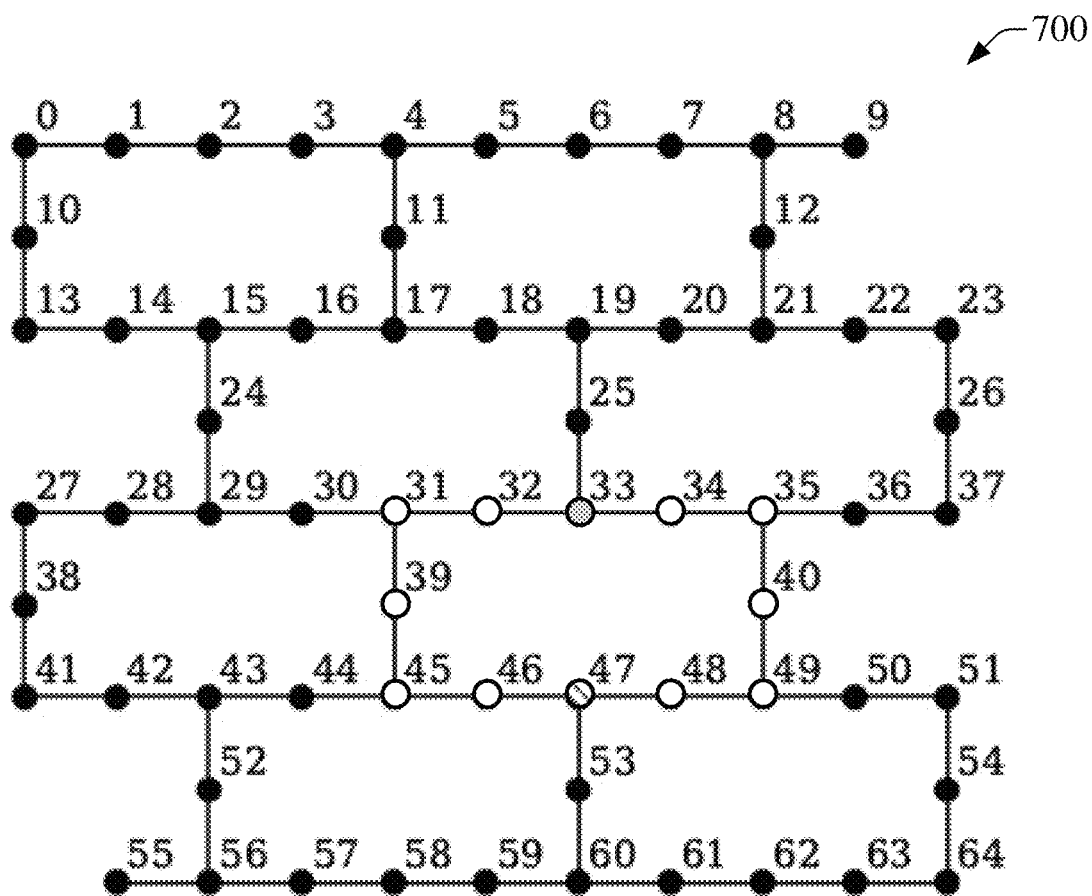
FIG. 7A illustrates a non-limiting example of another layout of qubit devices included in an operational environment for readout error mitigation in a quantum computation, in accordance with one or more embodiments described herein.

Simply as another illustration, FIG. 7A presents a non-limiting example of a layout 700 of the qubit devices 140. In the layout 700, 65 qubit devices are arranged in a geometry that exhibits many closed-loop chains of qubit devices. Each one of the 65 qubit devices is indexed with a number from 0 to 64. In one example, the 65 qubit devices are embodied in 65 transmon devices.

Figure 7B:
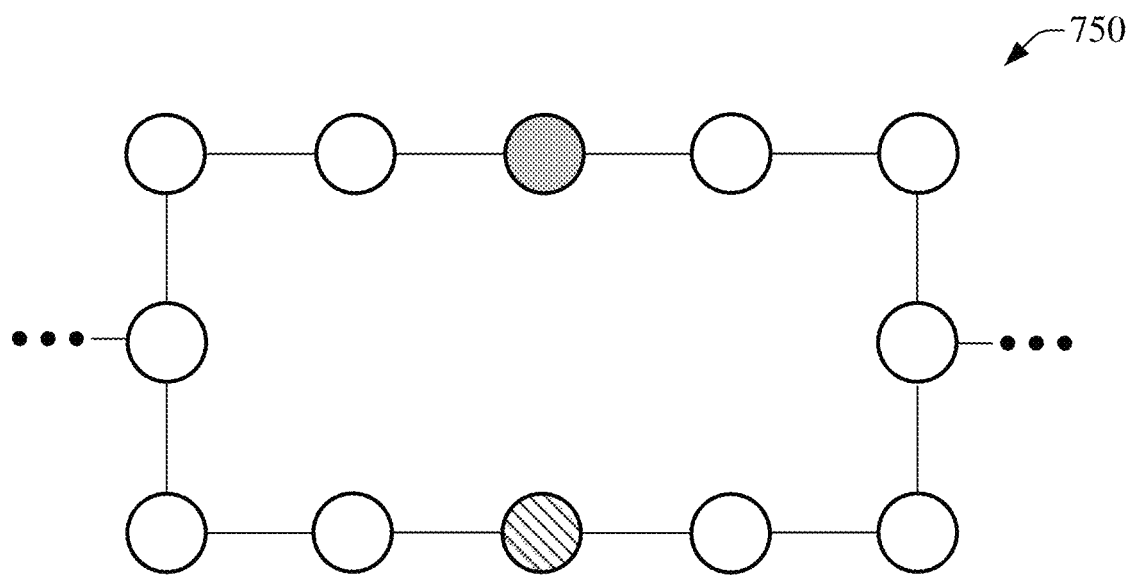
FIG. 7B illustrates a non-limiting example of a closed-loop chain 650 that is present in the layout shown in FIG. 7A.

FIG. 7B illustrates a non-limiting example of a closed-loop chain 750 that is present in the layout 700 shown in FIG. 7A. The closed-loop chain 750 includes 10 ancilla qubit devices, split into two branches that can be used as repetition branches: A first repetition branch including $a_1$, $a_2$, $a_3$, $a_4$, and $a_5$, and a second repetition branch including $b_1$, $b_2$, $b_3$, $b_4$, and $b_5$, Each one of the branches is coupled at one end with a root qubit and is further coupled with a flag qubit at the other end. One example of the closed-loop chain 750 includes qubit devices 32, 31, 39, 45, 46 as the first repetition branch; qubit devices 48, 49, 40, 35, and 34 as the second repetition branch; qubit device 33 as the root qubit; and qubit device 47 as the flag qubit. The foregoing numbers denoting qubit devices correspond to respective indices shown in FIG. 7A.

Figure 7C:
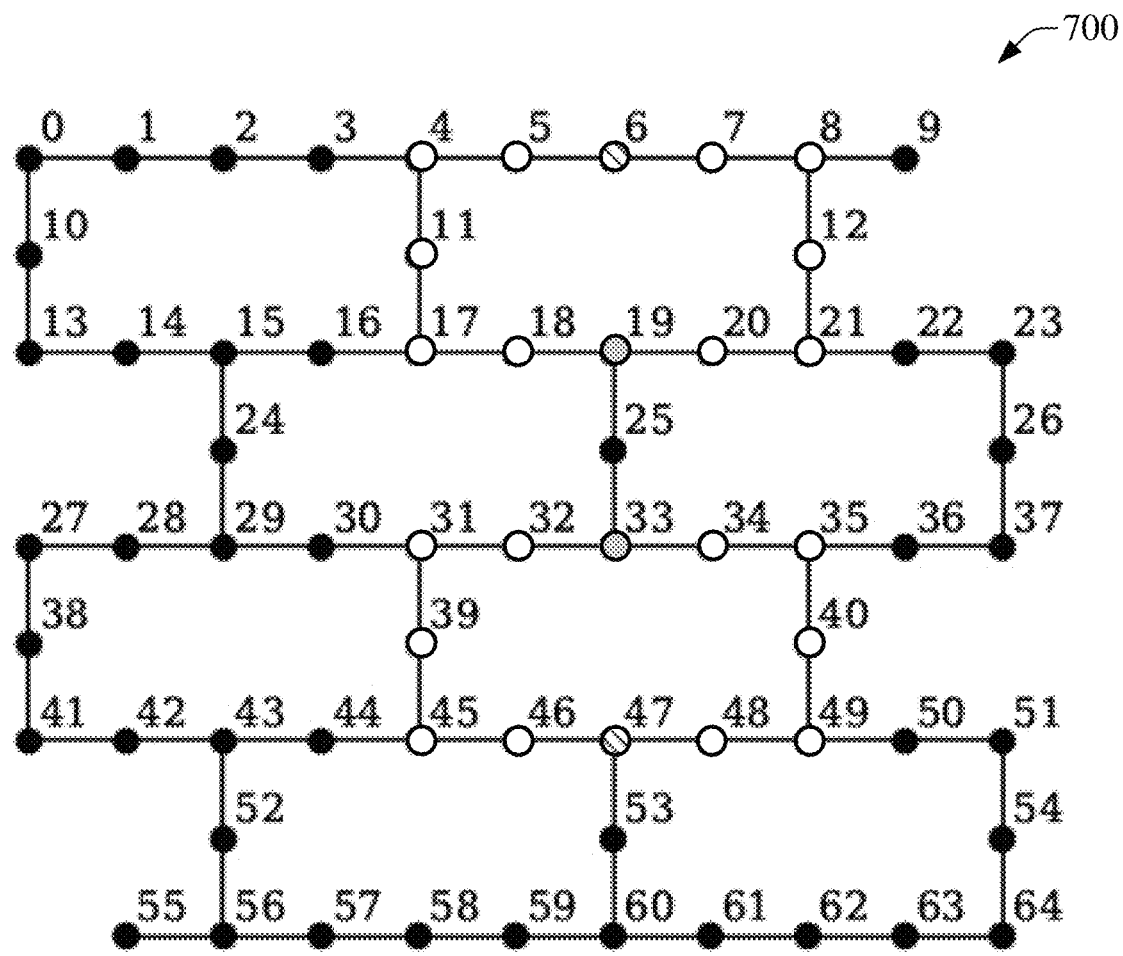
FIG. 7C illustrates a non-limiting example of two closed-loop chains that are present in the layout shown in FIG. 7A and can be utilized for circular repetition encoding of two qubits, in accordance with one or more embodiments described herein.

A replica of the layout 750 can be utilized for circular repetition encoding of two qubits. To that end, as an example, FIG. 7C illustrates two closed-loop chains that can be utilized for such an encoding: a first closed-loop chain including qubit devices 33, 32, 31, 39, 45, 46, 47, 48, 49, 40, 35, and 34, and a second closed-loop chain including qubit devices 19, 20, 21, 12, 8, 7, 6, 5, 4, 11, 17, and 18. The second closed-loop chain is coupled to the first closed-loop chain by qubit device 25. In that arrangement, the root qubits being encoded are qubit device 19 and qubit device 33, and the flag qubits are qubit device 47 and qubit device 6. Ancilla qubits are represented by white circles. The foregoing numbers denoting qubit devices correspond to respective indices shown in FIG. 7A.

Figure 8:
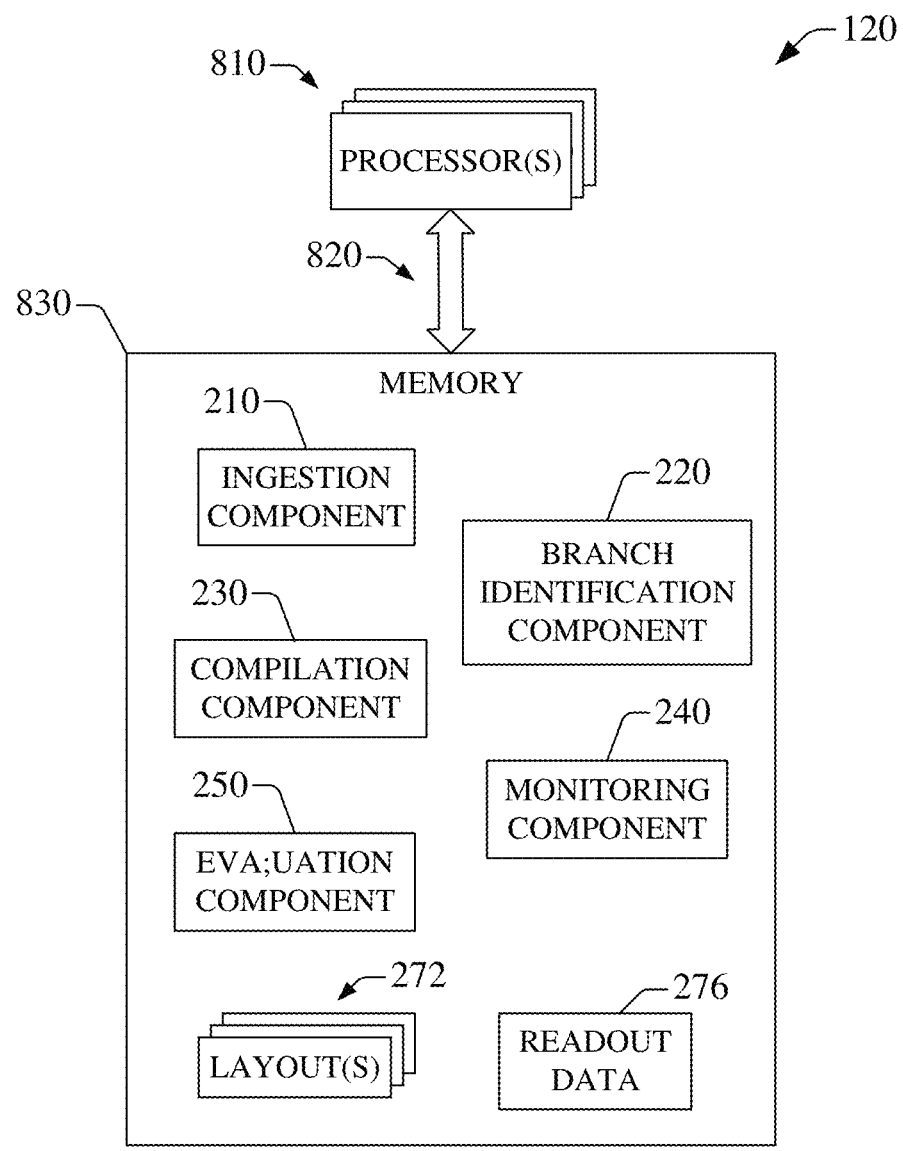
FIG. 8 illustrates a non-limiting example of a computing system for readout error mitigation in a quantum computation, in accordance with one or more embodiments described herein.

FIG. 8 is a block diagram of a non-limiting example of the compiler system 120 for readout error mitigation in a quantum program/computation, in accordance with one or more embodiments described herein. As is illustrated in FIG. 8, the compiler system 120 can include one or several processors 810 and one or several memory devices 830 (referred to as memory 830). In some embodiments, the processor(s) 810 can be arranged in a single computing apparatus (a blade server device or another type of server device, for example). In other embodiments, the processor(s) 810 can be distributed across two or more computing apparatuses (e.g., multiple blade server devices or other types of server devices).

The processor(s) 810 can be operatively coupled to the memory 830 via one or several communication interfaces 820, for example. The communication interface(s) 820 can be suitable for the particular arrangement (localized or distributed) of the processor(s) 810. In some embodiments, the communication interface(s) 820 can include one or many bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

Figure 9:
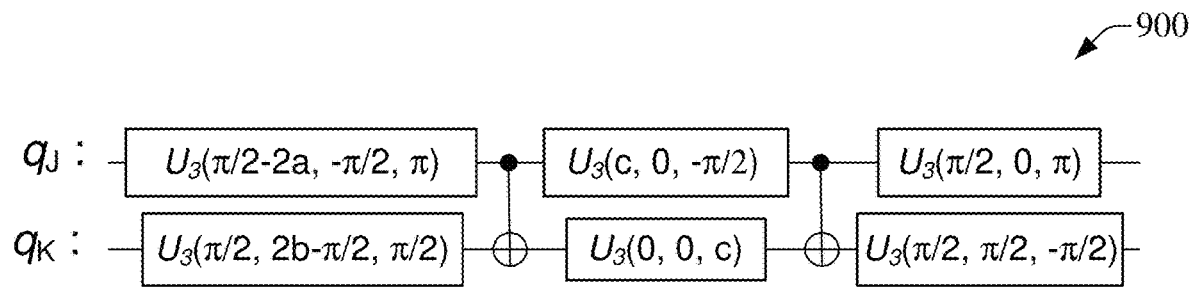
FIG. 9 illustrates a non-limiting example of a quantum circuit for computations of electronic energy structure of a helium hydride ($HeH^+$) molecule, in accordance with one or more embodiments described herein.

The memory 830 can retain or otherwise store therein machine-accessible components (e.g., computer-readable and/or computer-executable components) and data in accordance with this disclosure. As such, in some embodiments, machine-accessible instructions (e.g., computer-readable and/or computer-executable instructions) embody or otherwise constitute each one of the machine-accessible components within the memory 830. The machine-accessible instructions can be encoded in the memory 830 and can be arranged to form each one of the machine-accessible components. The machine-accessible instructions can be built (e.g., linked and compiled) and retained in computer-executable form within the memory 830 or in one or several other machine-accessible non-transitory storage media. Specifically, as is shown in FIG. 8, in some embodiments, the machine-accessible components include the ingestion component 210, the branch identification component 220, the compilation component 230, the monitoring component 240, and the evaluation component 250. The memory 830 also can include data (not depicted in FIG. 8) that permits various of the functionalities described herein. In some embodiments, the compilation component 230 can include one or a combination of the branch identification component 220, the monitoring component 240, and the evaluation component 250. As is illustrated in FIG. 9, the memory 930 can retain the layouts(s) 272 and the readout data 276.

The machine-accessible components, individually or in a particular combination, can be accessed and executed by at least one of the processor(s) 810. In response to execution, each one of the machine-accessible components can provide the functionality described herein in connection with readout error mitigation in a quantum computation. Accordingly, execution of the computer-accessible components retained in the memory 830 can cause the compiler system 120 to operate in accordance with aspects described herein. More concretely, at least one of the processor(s) 810 can execute the machine-accessible components to cause the compiler system 120 to encode one or more qubit devices (e.g., qubit device(s) or qudit device(s)) using a circular repetition code, adding an encoding unitary Uencoding to the a sequence of quantum gates corresponding to each one of the qubit device(s) during compilation of a quantum program to be executed in quantum hardware including the qubit device(s), in accordance with aspects of this disclosure.

Although not illustrated in FIG. 8, the compiler system 120 also can include other types of computing resources that can permit or otherwise facilitate the execution of the machine-accessible components retained in the memory 830. Those computing resources can include, for example, central processing units (CPUs), graphics processing units (GPUs), tensor processing units (TPUs), memory, disk space, incoming bandwidth, and/or outgoing bandwidth, interface(s) (such as I/O interfaces); controller devices(s); power supplies; and the like. For instance, the memory 830 also can include programming interface(s) (such as APIs); an operating system; software for configuration and or control of a virtualized environment; firmware; and similar.

The circular repetition encoding of this disclosure can be applied in quantum computations using quantum hardware 130 (FIG. 1) having circular connectivity. Those quantum computations can include electronic structure calculations and simulations of time propagation of model Hamiltonians, for example. Other types of quantum computations in chemistry and physics also can be implemented. It is also noted that this disclosure is not limited to those types of quantum computations. Indeed, the circular repetition encoding of this disclosure can be generally applied to any quantum computation.

Noisy quantum computers can permit, for example, implementing efficient quantum computations of electronic structure properties of chemical compounds. In some cases, such computations can rely on adaptive quantum circuits. For instance, a variational quantum eigensolver (VQE) algorithm relies on quantum resources to approximate electronic eigenstates and their corresponding energy expectation values $\rangle \Psi|H|\Psi \rangle$. Here, H is the electronic molecular Hamiltonian describing the chemical compound and $|\Psi\rangle$ is a parameterized wavefunction ansatz encoded on a qubit register.

As mentioned, the circular repetition encoding of this disclosure can mitigate readout errors. Accordingly, by implementing the VQE algorithm using the quantum hardware 130, the effect of such an encoding on the readout of energy expectation values can be analyzed. As an illustration, the VQE algorithm is implemented for the model systems HeH$^+$ and H$_2$. To that end, for HeH$^+$, perturbations to the Hartree-Fock (HF) ground state determinant are prepared for with a 2-qubit quantum circuit 900 shown in FIG. 9. Here, a, b, and c are variational parameters and $$U_3(\theta, \phi, \lambda) = \begin{pmatrix} \cos(\theta/2) & -e^{i\lambda}\sin(\theta/2) \\ e^{i\phi}\sin(\theta/2) & e^{i(\phi+\lambda)}\cos(\theta/2) \end{pmatrix}. \quad (2)$$

The quantum circuit 900 essentially corresponds to a Unitary Coupled-Cluster Single and Double (UCCSD) ansatz, and is used as an approximation to the reference HF dissociation curve for different interatomic distances.

Figure 10:
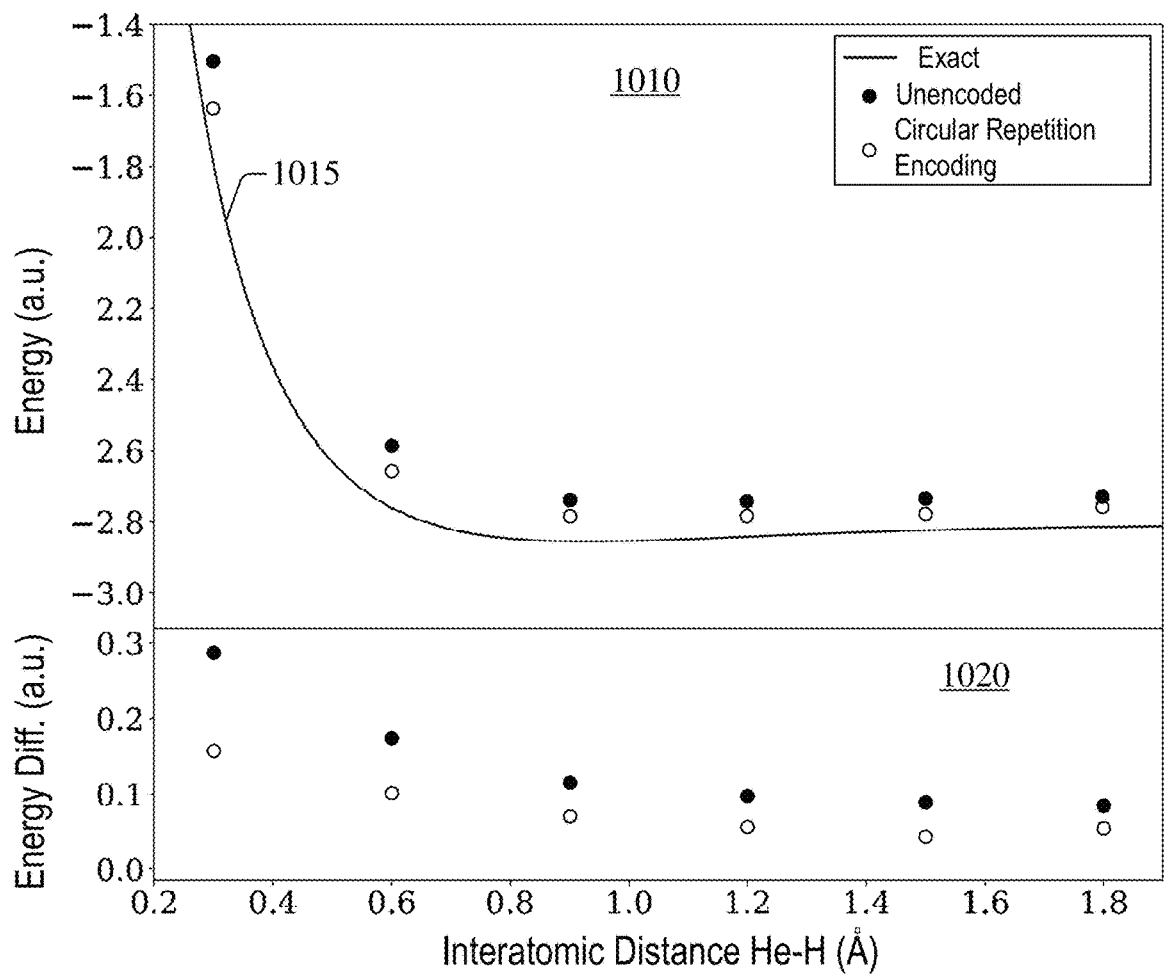
FIG. 10 illustrates results of a quantum computation of energy expectation values of a $HeH^+$ molecule at various interatomic distances, using circular repetition encoding, in accordance with one or more embodiments described herein.

The quantum circuit 900 was executed on the qubit devices 140, in an embodiment in which the qubit devices 140 include the qubit layout 700 (FIG. 7A). The quantum circuit 900 was executed both with circular repetition encoding and without circular repetition encoding. Results of quantum computations at respective interatomic distances are shown in diagram 1010. Same two qubit devices (labeled as $q_J$ and $q_K$ in FIG. 9, simply for the sake of nomenclature) are used for computations without circular repetition encoding (labeled "Uncoded" in FIG. 10 and FIG. 11) and as root qubits for computations with (4+1+1)-qubit circular repetition encoding. Hence, gate errors during the state preparation stage can be consistent, and the results can only differ in the quality of the readout measurements, thus emphasizing the effect of the circular repetition encoding for readout error mitigation. As is shown in FIG. 10, including circular repetition encoding in the quantum computations leads to an average decrease of the total error—defined as the difference from the reference energy values—by approximately 43% with respect to the unencoded quantum computations in this example. Reference energy values are shown as a solid trace 1015 (labeled "Exact") and are obtained using an unrestricted Hartree-Fock (UHF) classical calculation.

In connection with electronic structure of H$_2$, an (10+1+1)-qubit quantum chemistry experiment was performed on the quantum layout 700 (FIG. 7A), implementing a single-qubit VQE computation. Such a computation utilizes a 2-qubit reduction to the qubit-Hamiltonian obtained by parity-mapping results in a 2-qubit Hamiltonian $H_{H_2}^{(1q)} = h_0 II + h_1 IZ + h_2 ZI + h_3 ZZ + h_4 XX$, with $|01\rangle$ and $|10\rangle$ as ground state and excited state, respectively. Here, the coefficients $h_0$, $h_1$, and $h_2$ are defined by respective one-body integrals, and coefficient $h_3$ and $h_4$ are defined by respective two-body integrals. The equivalent 1-qubit Hamiltonian used in this disclosure has the following form:

$$H_{H_2}^{(1q)} = (h_0 - h_3)I + (h_2 - h_1)Z + h_4 X. \quad (3)$$

Figure 11:
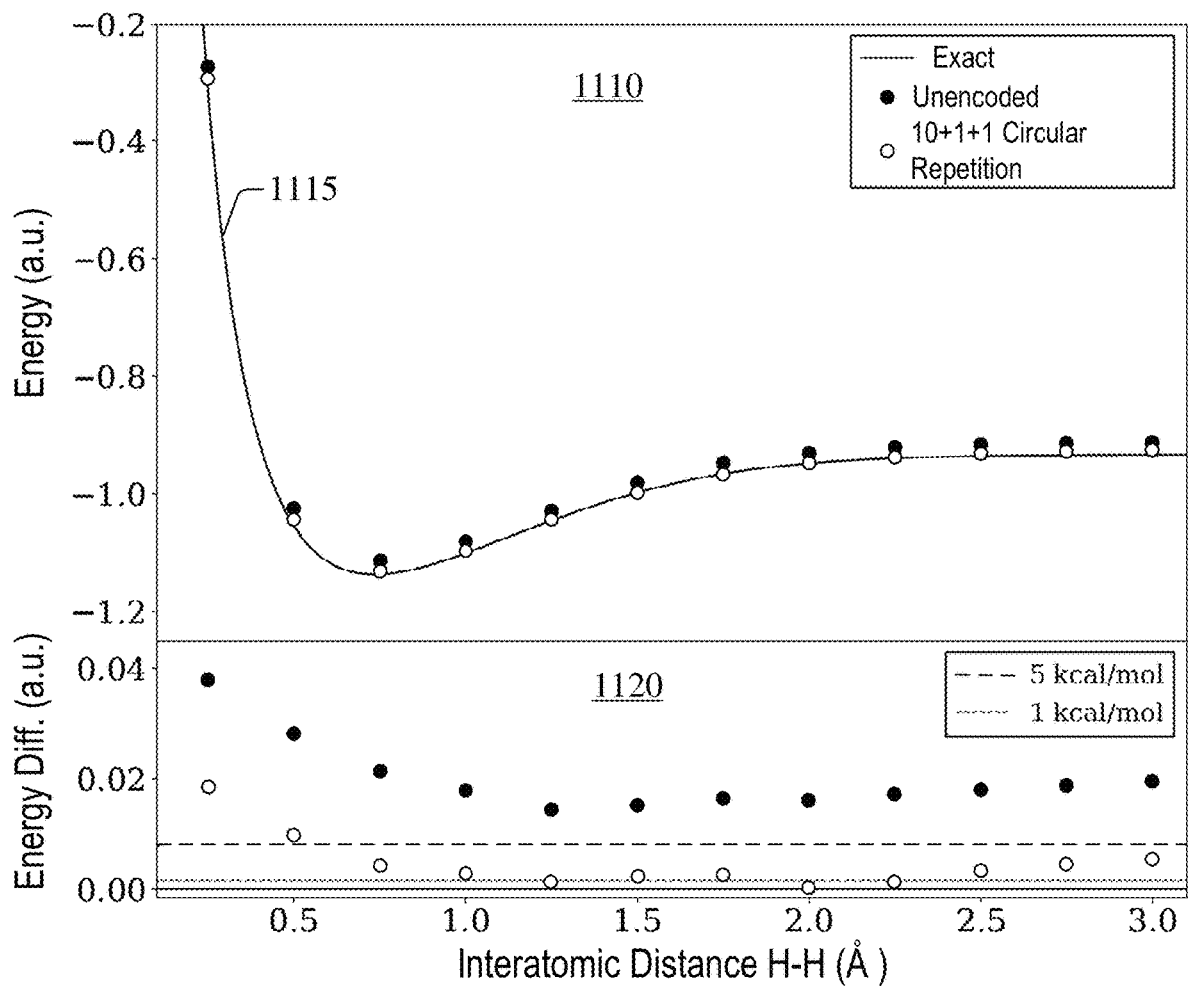
FIG. 11 illustrates results of a quantum computation of energy expectation values of a $H_2$ molecule at various interatomic distances, using circular repetition encoding, in accordance with one or more embodiments described herein.

In these computations, numerically optimized ansatz parameters of no-noise simulations are used to sample energy estimates beyond the reference HF results. Results of the computations are shown in diagram 1110 in FIG. 11. As illustrated in FIG. 11, the improved effect of circular repetition encoding is clearly visible in diagrams 1110 and 1120 in this additional example. Reference energy values are shown as a solid trace 1115 (labeled "Exact") and are obtained using a UHF classical calculation.

In order to illustrate the performance of circular repetition encoding described herein on deeper circuits, a digital quantum simulation of a 2-spin transverse field Ising model can be implemented. Such an Ising model is represented by the following Hamiltonian:

$$H = \alpha Z_1 Z_2 + \beta(X_1 + X_2) \quad (4)$$

The dynamical evolution of the system can be provided by the real time propagator $\mathcal{U}(t) = e^{-iHt}$, which operator can be approximated by the Suzuki-Trotter product formula:

$$\mathcal{U}(t) \approx \left(e^{-\frac{it}{n}\alpha Z_1 Z_2} e^{-\frac{it}{n}\beta(X_1+X_2)}\right)^n = [\mathcal{U}_n(t)]^n. \quad (5)$$

Figure 12:
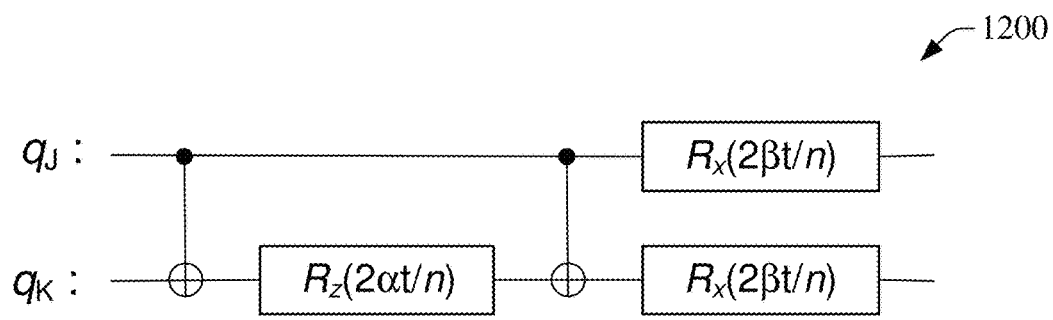
FIG. 12 illustrates a non-limiting example of a quantum circuit for computations of time evolution of an observable using a model Hamiltonian, in accordance with one or more embodiments described herein.

Each Trotter step $\mathcal{U}_n(t)$ can be implement using the combination of single-qubit rotations and CNOT gates shown in the quantum circuit 1200 in FIG. 12. Concatenation of n such quantum circuits can provide a digital simulation of the time dynamics of the transverse field Ising model (Eq. (4)).

Figure 13:
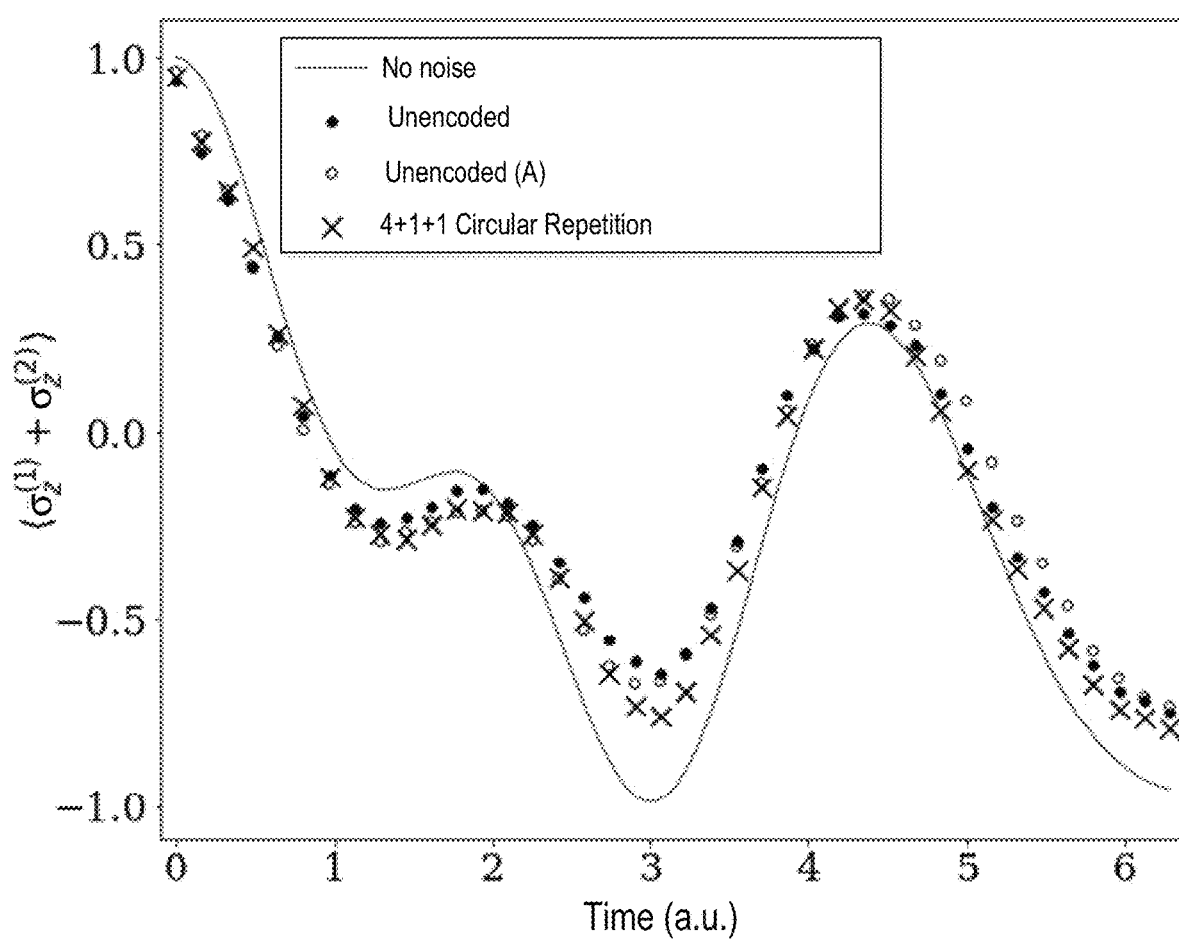
FIG. 13 illustrates results of a quantum computation of time evolution of total spin component along a z direction in a transverse field Ising model, in accordance with one or more embodiments described herein.

FIG. 13 illustrates the results from the implementation of the n=5 case on a quantum processor having the qubit layout 600 illustrated in FIG. 6A. The results depict the time evolution of the total spin component along a $z$ direction—$\langle \sigma_z^{(1)}+\sigma_z^{(2)}\rangle$. Similar to electronic structure computations described above, the same pair of qubit devices (indices 7 and 12 on the qubit layout 600) has been used both for the unencoded computation and as root qubits in the 4+1+1-circular repetition encoding. Results from such an uncoded computation are labeled as "Unencoded" in FIG. 13. Another pair of qubit devices (indices 15 and 16 on the qubit layout 600) also has been used in an uncoded computation as a reference computation because that pair of qubit devices exhibits the lowest readout error calibration data. Such reference results are labeled "Unencoded (A)" in FIG. 13. The results of the quantum computation using circular repetition encoding outperforms both unencoded quantum computations as shown in this additional example.

Figure 14:
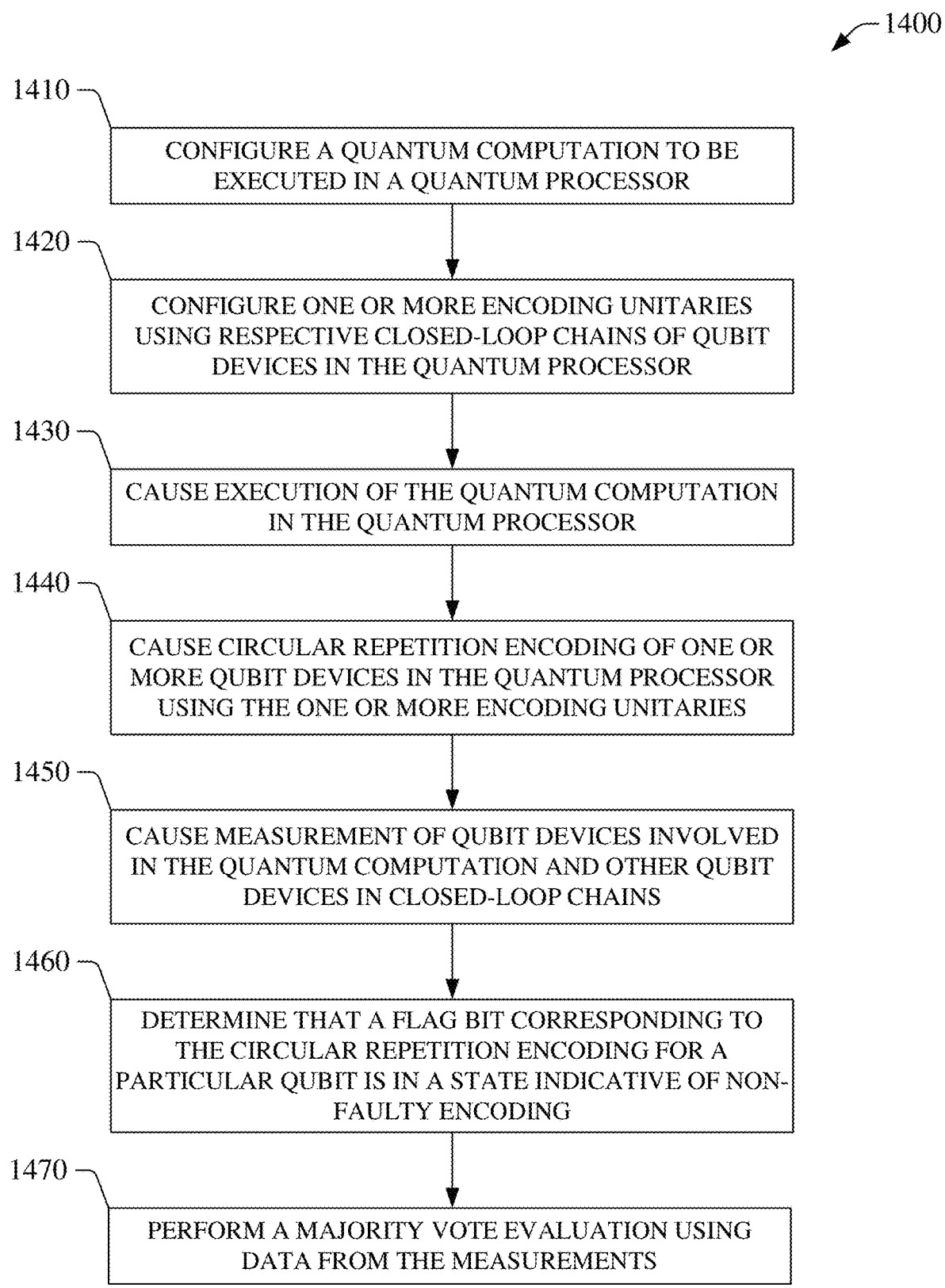
FIG. 14 illustrates a non-limiting example of a computer-implemented method for mitigating readout error in a quantum computation, in accordance with one or more embodiments described herein.

FIG. 14 is a flowchart of a non-limiting example of a computer-implemented method 1400 for mitigating readout error in quantum programs/computations, in accordance with one or more embodiments of this disclosure. As mentioned, readout error mitigation can be accomplished using circular repetition encoding. While described with reference to qubit devices, the example method 1400 also can be implemented for other types of quantum devices, such as qudit devices. A computing system can implement, at least partially, the computer-implemented method 1400. Implementing the computer-implemented method 1400 can include compiling or executing, or both, one or several of the blocks included in the computer-implemented method 1400, for example. The computing system can include and/or can be operatively coupled to one or several processors, one or several memory devices, other types of computing resources (such as communication interface(s), bus architectures, etc.), a combination thereof, or other similar resources. In some embodiments, the computing system can be embodied in, or can constitute, the compiler system 120 in accordance with the various embodiments described herein.

At block 1410, the computing system can configure a quantum computation to be executed in a quantum processor. To the end, the computing system can receive, via the ingestion component 210, for example, data defining a quantum program including one or several quantum circuits. The quantum program defining the quantum computation.

At block 1420, the computing system can configure one or more encoding unitaries using respective closed-loop chains of qubit devices (e.g., qubit devices 140 (FIG. 1)) in the quantum processor. The one or more unitaries can be configured by the compilation component 230, for example. Each encoding unitary ($U_{encoding}$) of the one or more encoding unitaries defines a circular repetition encoding of a qubit device involved in the quantum computation. As mentioned, the encoded qubit device is referred to as a root qubit. For example, in a two-qubit computation, the one or more unitaries being configured can be $U^{(0)}_{encoding}$ and $U(1)_{encoding}$ shown in FIG. 5B.

At block 1430, the computing system can cause execution of the quantum computation in the quantum processor. The compilation component 230 (FIG. 2) can cause the execution of the quantum computation.

At block 1440, the computing system can cause circular repetition encoding of one or more qubit devices (root qubit(s)) in the quantum processor using the one or more encoding unitaries. The compilation component 230 (FIG. 2) can cause the execution of the quantum computation. Causing the circular repetition encoding can include, for example, causing a translation of the operations defined in the one or more unitaries to pulse schedules, and further causing one or several components of the quantum hardware 130 to apply those scheduled to perform the circular repetition encoding. In some case, such a translation can be performed by the computing system, via the compilation component 230, for example. In other cases, the translation can be performed by quantum hardware 130.

At block 1450, the computing system can cause measurement of qubit devices involved in the quantum computation and other qubit devices in closed-loop chains. Those other qubit devices includes ancilla qubits and flag qubits. The monitoring component 240 can cause such measurements, for example.

At block 1460, the computing system can determine that a flag bit corresponding to the circular repetition encoding for a particular qubit device (e.g., particular root qubit) is in a state indicative of non-faulty encoding. The monitoring component 240 can cause such measurements, for example.

At block 1470, the computing system can perform a majority vote evaluation using data from the measurements. Such an evaluation can provide a readout-error-mitigated single-qubit state for the particular qubit. The evaluation component 250 can implement the majority vote evaluation, for example.

Figure 15:
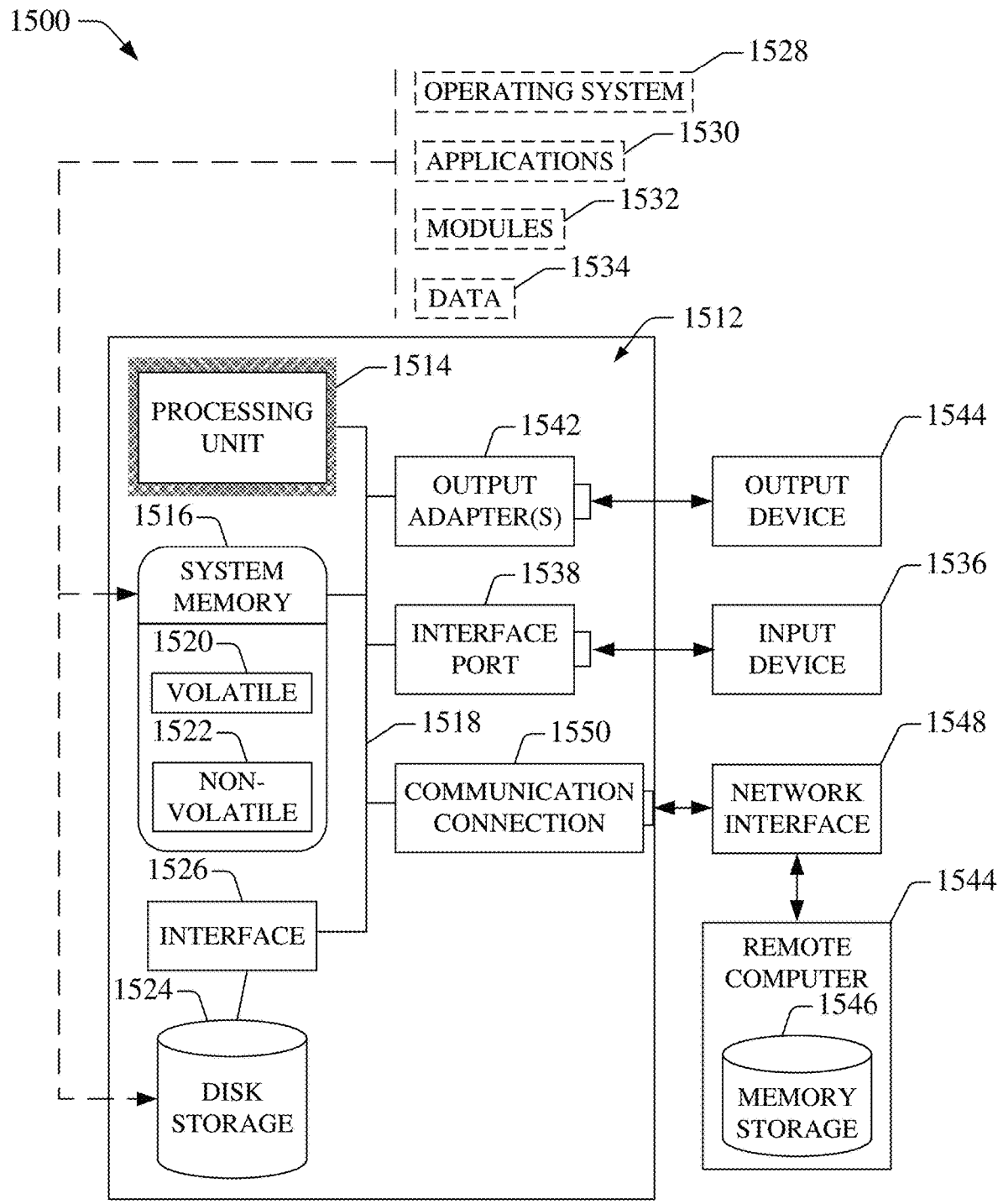
FIG. 15 is a block diagram of a non-limiting example of an operating environment in which one or more embodiments described herein can be implemented.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity. A suitable operating environment 1500 for implementing various aspects of this disclosure can include a computer 1512. The computer 1512 can also include a processing unit 1514, a system memory 1516, and a system bus 1518. The system bus 1518 can operably couple system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, can be stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface can be used, such as interface 1526. FIG. 15 also depicts software that can act as an intermediary between users and the basic computer resources described in the suitable operating environment 1500. Such software can also include, for example, an operating system 1528. Operating system 1528, which can be stored on disk storage 1524, acts to control and allocate resources of the computer 1512. System applications 1530 can take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through one or more input devices 1536. Input devices 1536 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1514 through the system bus 1518 via one or more interface ports 1538. The one or more Interface ports 1538 can include, for example, a serial port, a parallel port, a game port, and a universal serial bus (USB). One or more output devices 1540 can use some of the same type of ports as input device 1536. Thus, for example, a USB port can be used to provide input to computer 1512, and to output information from computer 1512 to an output device 1540. Output adapter 1542 can be provided to illustrate that there are some output devices 1540 like monitors, speakers, and printers, among other output devices 1540, which require special adapters. The output adapters 1542 can include, by way of illustration and not limitation, video and sound cards that provide a means of connection between the output device 1540 and the system bus 1518. It should be noted that other devices and/or systems of devices provide both input and output capabilities such as one or more remote computers 1544.

Computer 1512 can operate in a networked environment using logical connections to one or more remote computers, such as remote computer 1544. The remote computer 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer 1544. Remote computer 1544 can be logically connected to computer 1512 through a network interface 1548 and then physically connected via communication connection 1550. Further, operation can be distributed across multiple (local and remote) systems. Network interface 1548 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

In some embodiments, the compiler system 120 described herein can be associated with a cloud computing environment. For example, the compiler system 120 can be associated with a cloud computing environment 1650 included in the operational environment 1600 illustrated in FIG. 16, and/or with one or more functional abstraction layers described herein with reference to FIG. 17 (e.g., hardware and software layer 1760, virtualization layer 1770, management layer 1780, and/or workloads layer 1790).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
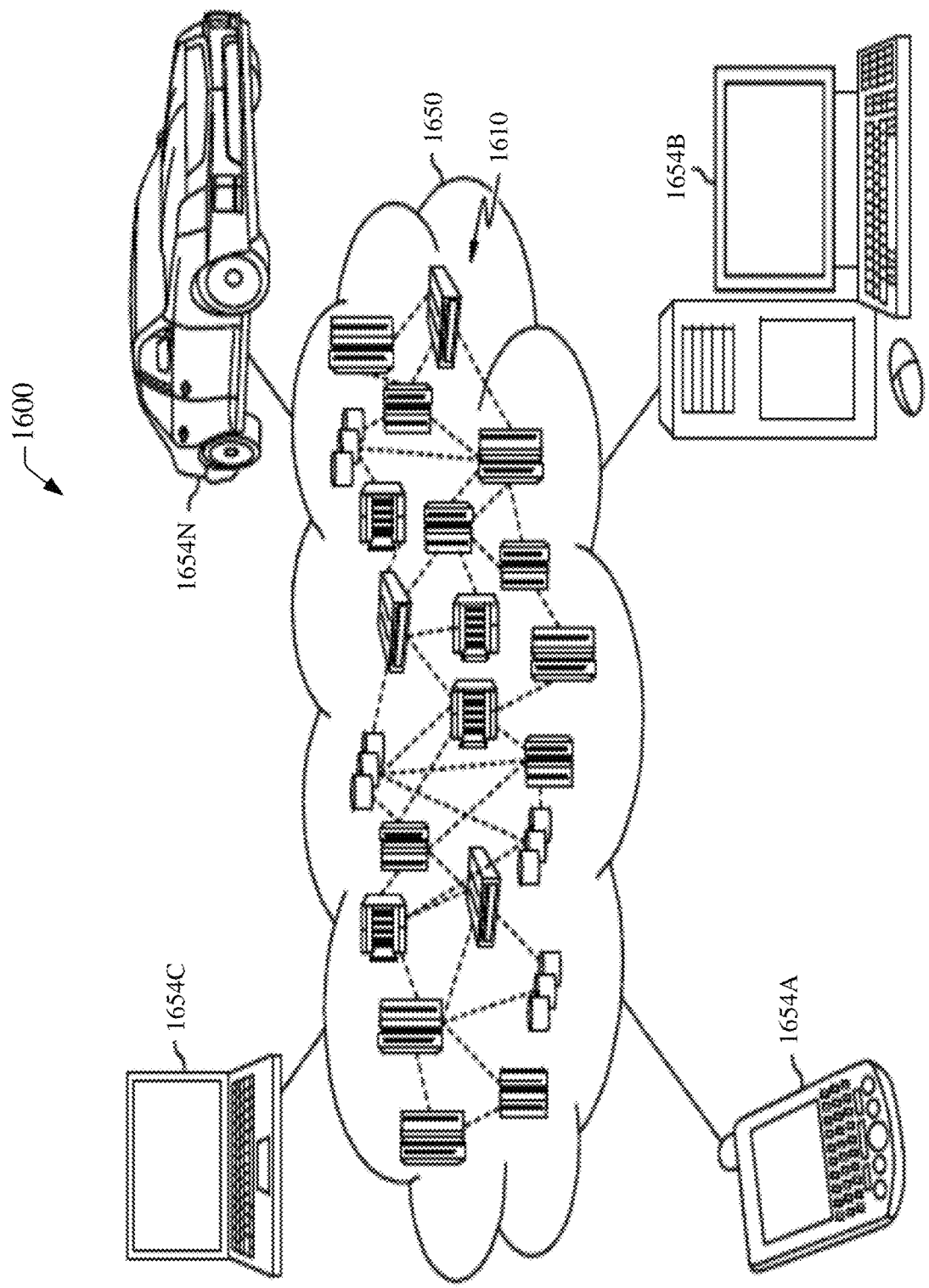
FIG. 16 is a block diagram of a non-limiting example of a cloud computing environment in accordance with one or more embodiments described herein.

Referring now to FIG. 16 an illustrative cloud computing environment 1650 is depicted. As shown, cloud computing environment 1650 includes one or more cloud computing nodes 1610 with which local computing devices used by cloud consumers, such as, for example, personal digital assistant (PDA) or cellular telephone 1654A, desktop computer 1654B, laptop computer 1654C, and/or automobile computer system 1654N may communicate. Although not illustrated in FIG. 16, cloud computing nodes 1610 can further comprise a quantum platform (e.g., quantum computer, quantum hardware, quantum software, and/or another quantum platform) with which local computing devices used by cloud consumers can communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1610 and cloud computing environment 1650 can communicate with any type of computerized device over any type of network and/or network addressable connection (e.g., using a web browser).

Figure 17:
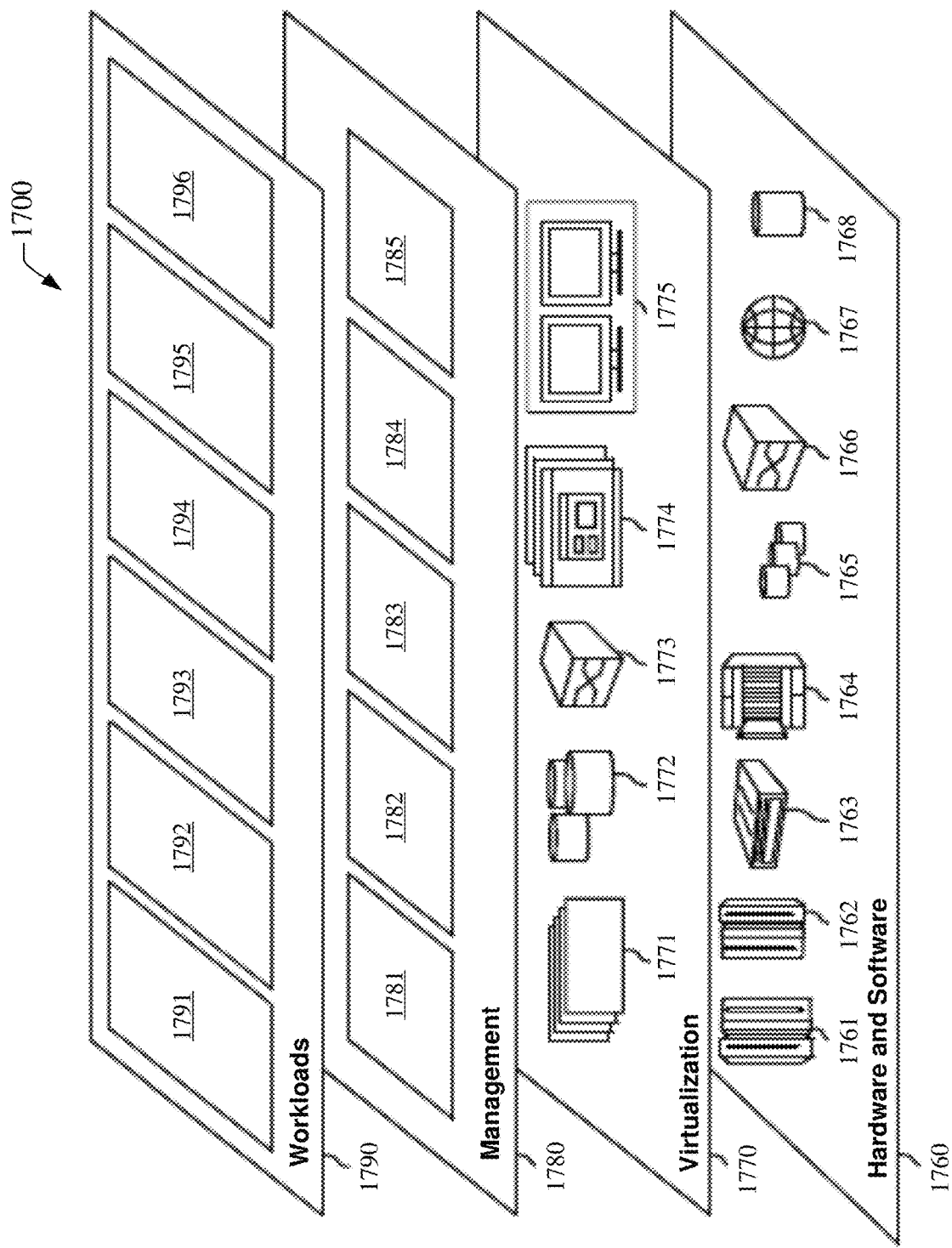
FIG. 17 is a block diagram of a non-limiting example of abstraction model layers in accordance with one or more embodiments described herein.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 include hardware and software components. Examples of hardware components include: mainframes 1761; RISC (Reduced Instruction Set Computer) architecture based servers 1762; servers 1763; blade servers 1764; storage devices 1765; and networks and networking components 1766. In some embodiments, software components include network application server software 1767, database software 1768, quantum platform routing software (not illustrated in FIG. 17), and/or quantum software (not illustrated in FIG. 17).

Virtualization layer 1770 provides an abstraction layer from which the following examples of virtual entities may be provided: virtual servers 1771; virtual storage 1772; virtual networks 1773, including virtual private networks; virtual applications and operating systems 1774; and virtual clients 1775.

In one example, management layer 1780 may provide the functions described below. Resource provisioning 1781 provides dynamic procurement of computing resources and other resources that are utilized to perform tasks within the cloud computing environment. Metering and pricing 1782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1783 provides access to the cloud computing environment for consumers and system administrators. Service level management 1784 provides cloud computing resource allocation and management such that required service levels are met. Service Level Agreement (SLA) planning and fulfillment 1785 provide pre-arrangement for, and procurement of, cloud computing resources for which a future requirement is anticipated in accordance with an SLA.

Workloads layer 1790 provides examples of functionality for which the cloud computing environment may be utilized. Non-limiting examples of workloads and functions which may be provided from this layer include: mapping and navigation 1791; software development and lifecycle management 1792; virtual classroom education delivery 1793; data analytics processing 1794; transaction processing 1795; and vulnerability risk assessment software 1796.

Embodiments of the present invention may be a system, a method, an apparatus and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," data storage," "database," "repository," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor; and
   a memory, communicatively coupled to the processor, the memory having stored therein computer-executable components, the computer-executable components comprising:
      a compilation component that encodes one or more qubits according to a circular repetition code at a time after operations on the one or more qubits and before readout; and
      a monitoring component that performs, via quantum hardware, a readout measurement of the one of more qubits.

2. The system of claim 1, wherein the computer-executable components further comprise a branch identification component that identifies a first chain of ancilla qubits coupled to a particular qubit of the one or more qubits, a second chain of ancilla qubits coupled to the particular qubit, and a flag qubit joining the first chain of ancilla qubits and the second chain of ancilla qubits, wherein the encoding the one or more qubits comprises encoding the particular qubit by:
   encoding the first chain of ancilla qubits according to the circular repetition code; and
   encoding the second chain of ancilla qubits according to the circular repetition code.

3. The system of claim 1, wherein the one or more qubits comprise multiple qubits, and wherein the encoding comprises circular repetition encoding, according to the circular repetition code, of a first qubit of the multiple qubits and a second qubit of the multiple qubits in parallel and independently from one another.

4. The system of claim 2, wherein the monitoring component measures, via the quantum hardware, a state of the flag qubit, wherein the state represents one of faulty encoding or non-faulty encoding of the particular qubit.

5. The system of claim 2, wherein a controlled NOT (CNOT) gate couples the flag qubit and an end ancilla qubit of the first chain of ancilla qubits, and wherein a second CNOT couples the flag qubit an end ancilla qubit of the second chain of ancilla qubits.

6. The system of claim 2, wherein the particular qubit, the first chain of ancilla qubits, the second chain of ancilla qubits, and the flag qubit are arranged in a layout having circular connectivity.

7. The system of claim 1, wherein the one or more qubits are included in a qubit layout exhibiting heavy hexagonal connectivity.

8. The system of claim 1, wherein the one or more qubits constitute a quantum processor of one of a cloud-based quantum computer or a local quantum computer.

9. A computer-implemented method, comprising:
   encoding, by a system comprising a processor, encoding of one or more qubits according to a circular repetition code at a time after operations on the one or more qubits and before readout; and
   performing, by the system, via quantum hardware, a readout measurement of the one of more qubits.

10. The computer-implemented method of claim 9, further comprising identifying, by the system, a first chain of ancilla qubits coupled to a particular qubit of the one or more qubits, a second chain of ancilla qubits coupled to the particular qubit, and a flag qubit joining the first chain of ancilla qubits and the second chain of ancilla qubits, wherein the encoding of the one or more qubits comprises encoding the particular qubit by:
    encoding the first chain of ancilla qubits according to the circular repetition code; and
    encoding the second chain of ancilla qubits according to the circular repetition code.

11. The computer-implemented method of claim 9, wherein the one or more qubits comprises multiple qubits, and wherein the encoding the one or more qubits comprises encoding, according to the circular repetition code, a first qubit of the multiple qubits and a second qubit of the multiple qubits in parallel and independently from one another.

12. The computer-implemented method of claim 10, further comprising measuring, by the system, via the quantum hardware, a state of the flag qubit, the state representing one of faulty encoding or non-faulty encoding of the particular qubit.

13. The computer-implemented method of claim 9, further comprising applying, by the system, the encoding of the one or more qubits in a quantum computation of time propagation of a quantum observable.

14. The computer-implemented method of claim 9, further comprising applying, by the system, the encoding of the one or more qubits in a variational quantum algorithm.

15. The computer-implemented method of claim 10, wherein the particular qubit, the first chain of ancilla qubits, the second chain of ancilla qubits, and the flag qubit are arranged in a layout having circular connectivity.

16. A computer program product for mitigation of readout errors in a quantum computation, the computer program product comprising a computer-readable storage medium having program instructions embodied therewith, the program instructions executable by a processor to cause the processor to:
    encode, by the processor, one or more qubits according to a circular repetition code at a time after operations on the one or more qubits and before readout; and
    perform, by the processor, via quantum hardware, a readout measurement of the one of more qubits.

17. The computer program product of claim 16, wherein the program instructions are further executable by the processor to cause the processor to identify a first chain of ancilla qubits coupled to a particular qubit of the one or more qubits, a second chain of ancilla qubits coupled to the particular qubit, and a flag qubit joining the first chain of ancilla qubits and the second chain of ancilla qubits, and wherein the encoding of the one or more qubits comprises encoding the particular qubit by:
  encoding the first chain of ancilla qubits according to the circular repetition code; and
  encoding the second chain of ancilla qubits according to the circular repetition code.

18. The computer program product of claim 16, wherein the one or more qubits comprises multiple qubits, and wherein the encoding of the one or more qubits comprises encoding, according to the circular repetition code, a first qubit of the multiple qubits and a second qubit of the multiple qubits in parallel.

19. The computer program product of claim 17, the program instructions further executable by the processor to cause the processor to measure, via the quantum hardware, a state of the flag qubit, the state representing one of faulty encoding or non-faulty encoding of the multiple qubits.

20. The computer program product of claim 17, wherein the particular qubit, the first chain of ancilla qubits, the second chain of ancilla qubits, and the flag qubit are arranged in a layout having circular connectivity.

* * * * *